(12) United States Patent
Knoener et al.

(10) Patent No.: US 12,496,650 B2
(45) Date of Patent: Dec. 16, 2025

(54) METHOD FOR SETTING WELDING PARAMETERS

(71) Applicant: Illinois Tool Works Inc., Glenview, IL (US)

(72) Inventors: Craig Steven Knoener, Appleton, WI (US); John Carmen Granato, Jr., Greenville, WI (US); Albert Matthew Nowak, Appleton, WI (US); Megan Katherine Parker, Appleton, WI (US); Benjamin D. Romenesko, Hortonville, WI (US); Joshua Thomas Stiever, Appleton, WI (US); Ronald Dewayne Woodward, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/096,176

(22) Filed: Jan. 12, 2023

(65) Prior Publication Data

US 2023/0150049 A1    May 18, 2023

Related U.S. Application Data

(63) Continuation of application No. 13/429,017, filed on Mar. 23, 2012, now Pat. No. 11,554,439.

(Continued)

(51) Int. Cl.
*B23K 9/095*     (2006.01)
*B23K 9/10*      (2006.01)
*B23K 9/32*      (2006.01)

(52) U.S. Cl.
CPC ............ *B23K 9/095* (2013.01); *B23K 9/1006* (2013.01); *B23K 9/32* (2013.01)

(58) Field of Classification Search
CPC ........ B23K 9/09; B23K 9/095; B23K 9/1006; B23K 9/32
See application file for complete search history.

(56) References Cited

U.S. PATENT DOCUMENTS

| 2,424,324 | A | 7/1947 | Murcek |
| 3,125,671 | A | 3/1964 | Manz |

(Continued)

FOREIGN PATENT DOCUMENTS

| CN | 1539588 | 10/2004 |
| CN | 1646252 | 7/2005 |

(Continued)

OTHER PUBLICATIONS

International Search Report & Written Opinion of PCT/US2012/030451 dated Jul. 11, 2012.

(Continued)

*Primary Examiner* — Jimmy Chou
(74) *Attorney, Agent, or Firm* — McAndrews, Held & Malloy, Ltd.

(57) ABSTRACT

Systems and methods for setting welding parameters are provided. For example, in certain embodiments, a method includes receiving an input relating to a change in a parameter of welding power of a welding system via a welding system interface. The method also includes displaying a graphical representation of an acceptable range of values for the parameter of the welding power on a display device of the welding system interface, wherein the acceptable range of values is based on other parameters of a welding process being performed by the welding system. The method further includes constraining subsequent manual inputs relating to changes in the parameter of the welding power to the acceptable range of values.

20 Claims, 26 Drawing Sheets

Related U.S. Application Data

(60) Provisional application No. 61/467,451, filed on Mar. 25, 2011.

(56) References Cited

U.S. PATENT DOCUMENTS

| | | | |
|---|---|---|---|
| 3,555,239 A | 1/1971 | Kerth | |
| 3,924,094 A | 12/1975 | Hansen | |
| 4,093,844 A | 6/1978 | Fellure | |
| 4,438,317 A | 3/1984 | Ueguri | |
| 4,510,373 A | 4/1985 | Cox | |
| 4,608,482 A | 8/1986 | Cox | |
| 4,721,947 A | 1/1988 | Brown | |
| 4,973,821 A | 11/1990 | Martin | |
| 5,043,554 A | 8/1991 | Kohsaka | |
| 5,278,390 A | 1/1994 | Blankenship | |
| 5,571,431 A | 11/1996 | Lantieri | |
| 5,643,479 A | 7/1997 | Lloyd | |
| 6,091,048 A | 7/2000 | Lanouette | |
| 6,096,994 A | 8/2000 | Handa | |
| 6,166,350 A | 12/2000 | Sickels | |
| 6,167,328 A | 12/2000 | Takaoka | |
| 6,476,354 B1 | 11/2002 | Jank | |
| 6,583,386 B1 | 6/2003 | Ivkovich | |
| 6,649,870 B1 | 11/2003 | Barton | |
| 6,735,540 B2 | 5/2004 | Pedrazzini | |
| 6,744,011 B1 | 6/2004 | Hu | |
| 6,930,280 B2 | 8/2005 | Zauner | |
| 8,546,728 B2 | 10/2013 | Sickels | |
| 8,604,389 B2 | 12/2013 | Stanzel | |
| 8,766,132 B2 | 7/2014 | Blankenship | |
| 8,885,110 B1* | 11/2014 | St. Clair | H04N 5/65 348/836 |
| 8,952,292 B2 | 2/2015 | Behmlander | |
| 9,566,657 B2 | 2/2017 | Knoener | |
| 9,802,265 B2 | 10/2017 | Sickels | |
| 2001/0047987 A1 | 12/2001 | Nowak | |
| 2004/0004064 A1 | 1/2004 | Lanouette | |
| 2004/0020911 A1 | 2/2004 | Centner | |
| 2004/0095704 A1 | 5/2004 | Cigelske | |
| 2004/0099648 A1 | 5/2004 | Hu | |
| 2004/0129759 A1 | 7/2004 | Rouault | |
| 2004/0173591 A1 | 9/2004 | Knoener | |
| 2004/0226930 A1 | 11/2004 | Radtke | |
| 2005/0000946 A1 | 1/2005 | Albrecht | |
| 2005/0016979 A1 | 1/2005 | Stein | |
| 2005/0045608 A1 | 3/2005 | Sykes | |
| 2005/0045611 A1 | 3/2005 | Ihde | |
| 2005/0161448 A1 | 7/2005 | Stava | |
| 2005/0173393 A1 | 8/2005 | Nowak | |
| 2007/0155347 A1 | 7/2007 | Heuermann | |
| 2007/0181553 A1* | 8/2007 | Stanzel | B23K 9/124 219/137.71 |
| 2008/0203065 A1 | 8/2008 | Feldhausen | |
| 2008/0208387 A1 | 8/2008 | Divenere | |
| 2009/0071949 A1 | 3/2009 | Harris | |
| 2009/0152251 A1 | 6/2009 | Dantinne | |
| 2009/0173726 A1 | 7/2009 | Davidson et al. | |
| 2009/0277893 A1 | 11/2009 | Speilman | |
| 2010/0258691 A1* | 10/2010 | Zdancewicz | G06F 1/1609 24/306 |
| 2010/0314370 A1 | 12/2010 | Granato | |
| 2011/0049116 A1 | 3/2011 | Rappl | |
| 2011/0187947 A1* | 8/2011 | Tsanev | H04N 5/64 359/507 |
| 2012/0006800 A1 | 1/2012 | Ryan | |
| 2012/0189993 A1 | 7/2012 | Kindig | |
| 2012/0241429 A1* | 9/2012 | Knoener | B23K 9/1006 219/130.01 |
| 2013/0092672 A1 | 4/2013 | Peters | |
| 2013/0256289 A1 | 10/2013 | Knoener | |
| 2014/0061169 A1* | 3/2014 | Sammons | B23K 9/1006 219/109 |
| 2014/0263225 A1 | 9/2014 | Daniel et al. | |
| 2015/0306693 A1 | 10/2015 | Peters | |
| 2016/0039034 A1 | 2/2016 | Becker | |
| 2017/0036288 A1 | 2/2017 | Albrecht | |

FOREIGN PATENT DOCUMENTS

| | | |
|---|---|---|
| CN | 102378666 | 3/2012 |
| CN | 103071891 | 5/2013 |
| CN | 104203475 | 12/2014 |
| DE | 4112985 | 10/1992 |
| DE | 9301390 | 4/1993 |
| DE | 19733638 | 2/1999 |
| EP | 0901865 A2 | 3/1999 |
| EP | 0987079 | 3/2000 |
| EP | 1445055 | 8/2004 |
| EP | 1512480 | 3/2005 |
| EP | 1559496 | 8/2005 |
| FR | 2836641 | 9/2003 |
| JP | S5719185 | 2/1982 |
| WO | 0112376 | 2/2001 |
| WO | 2009037541 A1 | 3/2009 |
| WO | 2010142858 A1 | 12/2010 |

OTHER PUBLICATIONS

International Search Report from PCT application No. PCT/US2016/018695, dated Jun. 22, 2016, 13 pgs.
International Search Report from PCT application No. PCT/US2016/022064, dated Jun. 29, 2016, 12 pgs.
Canadian Office Action appln. No. 2,830,995 dated Nov. 2, 2017 (4 pages).
Canadian Office Action Appln No. 3,006,557 dated Mar. 15, 2019.
Canadian Office Action Appln No. 3,006,557 dated Feb. 11, 2020 (4 pgs).
Int'l Search Report Appln No. PCT/US2016/066330 mailed Sep. 5, 2017 (2 pgs).
Fa Zhang et al., "Welding Method and Practice", Beijing Institute of Technology Press, Jul. 31, 2014, pp. 130-134.
European Office Action Appln No. 16867418.2 dated Nov. 7, 2022.

* cited by examiner

METHOD FOR SETTING WELDING PARAMETERS

CROSS-REFERENCE TO RELATED APPLICATIONS

This application is a continuation application of U.S. patent application Ser. No. 13/429,017, entitled "Method For Setting Welding Parameters" filed Mar. 23, 2012, which claims priority to U.S. Provisional Patent Application No. 61/467,451 entitled "Method For Setting Welding Parameters" filed Mar. 25, 2011.

BACKGROUND

The present invention generally relates to systems and methods for setting welding parameters.

A common metal welding technique employs the heat generated by electrical arcing to transition a work piece to a molten state, to facilitate a welding process. One technique that employs this arcing principle is wire-feed welding. At its essence, wire-feed welding involves routing welding current from a power source into an electrode that is brought into close proximity with the work piece. When close enough, current arcs from the electrode to the work piece, completing a circuit and generating sufficient heat to weld the work piece. Often, the electrode is consumed and becomes part of the weld itself. Thus, new wire electrode is advanced, replacing the consumed electrode and maintaining the welding arc. If the welding device is properly adjusted, the wire-feed advancement and arcing cycle progresses smoothly, providing a good weld.

Traditionally, during a welding operation, an operator selects the level and types of resources provided to the weld location, depending, of course, on the particulars of the weld and the materials being welded. For instance, an operator may select between various kinds and sizes of wire electrode, ranging from the diameter of wire to the material the wire electrode is made of. Different kinds of wire electrode, however, perform well at different operational settings of the welding device. That is, different kinds of wire electrodes perform well within different voltage range of values and wire-feed speeds, for instance. For example, a given 0.023 inch mild-steel wire electrode may perform well at 17 volts and with a wire-feed speed of 250 inches per minute, while a 0.035 inch mild steel wire electrode performs well at 19 volts with a wire-feed speed of 230 inches per minute.

Conventionally, welding devices rely on the knowledge and acumen of the operator to select the most appropriate voltage and wire feed settings for the wire electrode being used and weld conditions. Unfortunately, in many cases, the weld operator is a novice to the field, especially in the case of portable welding devices. If the operator does not properly adjust the voltage and wire-feed speed settings, the arcing may not be sufficient to produce a good weld, or any weld at all. Furthermore, in traditional devices, the wire-feed speed control and the voltage control are wholly independent from one another, thus making it difficult for the operator to adjust both parameters while a weld is progressing.

BRIEF DESCRIPTION

In one embodiment, a welding system includes a power source configured to generate power and deliver the power to a welding torch, and a welding wire feeder configured to advance wire electrode into the welding torch at a rate of advancement, and an interface. The interface includes a first input device configured to receive an input relating to a parameter of the power. The interface also includes a second input device configured to receive an input relating to the rate of advancement of the wire electrode. The interface further includes a third input device configured to receive an input relating to whether the parameter of the power and the rate of advancement of the wire electrode are automatically set based on each other. The interface also includes a display device configured to display the parameter of the power, the rate of advancement of the wire electrode, a first graphical representation of an acceptable range of values for the parameter of the power, and a second graphical representation of an acceptable range of values for the rate of advancement of the wire electrode. In addition, the welding system includes control circuitry configured to adjust and display the first graphical representation of the acceptable range of values for the parameter of the power when an input is received by the first input device and the third input device is activated, and to adjust and display the second graphical representation of the acceptable range of values for the rate of advancement of the wire electrode when an input is received by the second input device and the third input device is activated.

In another embodiment, a welding system includes a power source configured to generate power and deliver the power to a welding torch, and an interface. The interface includes a first input device configured to receive an input relating to a parameter of the power. In addition, the interface includes a second input device configured to receive an input relating to whether the parameter of the power is bound to an acceptable range of values based on other parameters of a welding process. The interface also includes a display device configured to display the parameter of the power, and a graphical representation of an acceptable range of values for the parameter of the power. In addition, the welding system includes control circuitry configured to adjust and display the graphical representation of the acceptable range of values for the parameter of the power when an input is received by the first input device and the second input device is activated.

In another embodiment, a method includes receiving an input relating to a change in a parameter of power of a welding system via a welding system interface. The method also includes displaying a graphical representation of an acceptable range of values for the parameter of the power on a display device of the welding system interface, wherein the acceptable range of values is based on other parameters of a welding process being performed by the welding system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
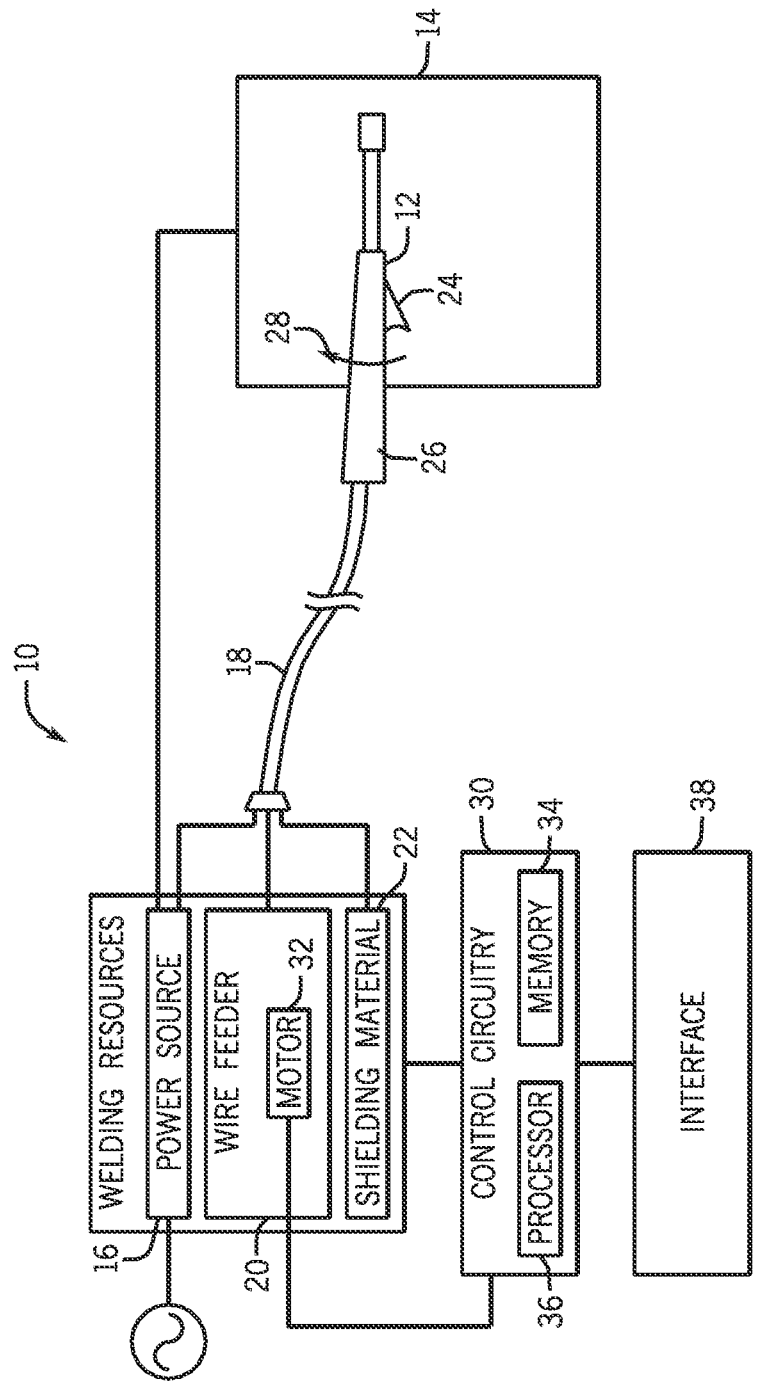
FIG. 1 is a schematic diagram of an embodiment of a welding system, wherein an interface is configured to display welding parameters of the welding system.

Turning now to the figures, FIG. 1 illustrates a welding system 10 that includes a welding torch 12 that defines the location of the welding operation with respect to a work piece 14. Placement of the welding torch 12 at a location proximate to the work piece 14 allows electrical current provided by a power source 16, which converts incoming alternating current (AC) power to an appropriate direct current (DC) power—and routed to the welding torch 12 via a welding torch cable 18, to arc from the welding torch 12 to the work piece 14. In summary, this arcing completes an electrical circuit from the power source 16, to the welding torch 12 via the welding torch cable 18, to a wire electrode, to the work piece 14, and at its conclusion, back to the power source 16. This arcing generates a relatively large amount of heat causing the work piece 14 and/or filler metal to transition to a molten state, facilitating the weld.

To produce electrical arcing, the exemplary welding system 10 includes a wire feeder 20 that provides a consumable wire electrode to the welding torch cable 18 and, in turn, to the welding torch 12. The welding torch 12 conducts electrical current to the wire electrode via a contact tip (not shown) located in a neck assembly of the welding torch 12, leading to arcing between the egressing wire electrode and the work piece 14.

To shield the weld area from contaminants during welding, to enhance arc performance, and to improve the resulting weld, the exemplary welding system 10 includes a gas source 22 that feeds an inert shielding gas to the welding torch 12 via the welding torch cable 18. It is worth noting, however, that a variety of shielding materials, including various fluids and particulate solids, may be employed to protect the weld location. Additionally, certain wire electrodes are designed to operate without a shielding material.

Advancement of these welding resources (e.g., welding current, wire-electrode, and shielding gas) is effectuated by actuation of a trigger 24 secured to a handle 26 of the welding torch 12. By depressing the trigger 24 (arrow 28), a switch disposed within the trigger 24 is closed, causing the transmission of an electrical signal that commands promotion of the welding resources into the welding torch cable 18. For example, depressing the trigger 24 sends a signal to control circuitry 30, which, in turn, activates a motor 32 that advances wire electrode into the welding torch cable 18, opens a valve to allow the flow of shielding material, and commands the power source 16 to output the desired level of power to the wire electrode. In certain embodiments, the control circuitry 30 includes memory components 34, to store programming instructions, command programs, appropriate data, etc. The control circuitry 30 also includes a processing device, such as a processor 36, among others types of devices, to effectuate control of the welding system 10.

To adjust operating parameters of the welding system 10, a user interface 38 may be included as part of the system 10. The user interface 38 is the means by which a user or an operator interacts with the welding system 10. The user interface 38 may include input devices such as a keypad, stylus, pushbuttons, dials, or any form of transducer that converts a physical interaction with the user interface 38 into an electrical signal input. In certain embodiments, the user interface 38 may also include a display screen to display graphics, buttons, icons, text, windows, and similar features relating to the setting and displaying of welding parameters. For example, the user interface 38 may be a graphical interface, and may display graphical indicators of welding parameters such as voltage, amperage, and wire-feed speed in varying colors in the case that the system is operating under overvoltage, overamperage, or overspeed conditions.

As will be discussed henceforth and illustrated by FIGS. 2-25, in certain embodiments, the user interface 38 may include a welding process selector 40, an electrode diameter adjustor 42, a material thickness adjustor 44, an auto-set selector 46, a display screen 48, and voltage and wire-feed speed and/or amperage adjust dials 50 and 52, respectively. For further purpose of illustration, FIG. 2 will be referenced in the discussion of the aforementioned components of the user interface 38, although it should be appreciated that FIGS. 3-25 may embody the same components, features, characteristics, properties, and so forth.

Figure 2:
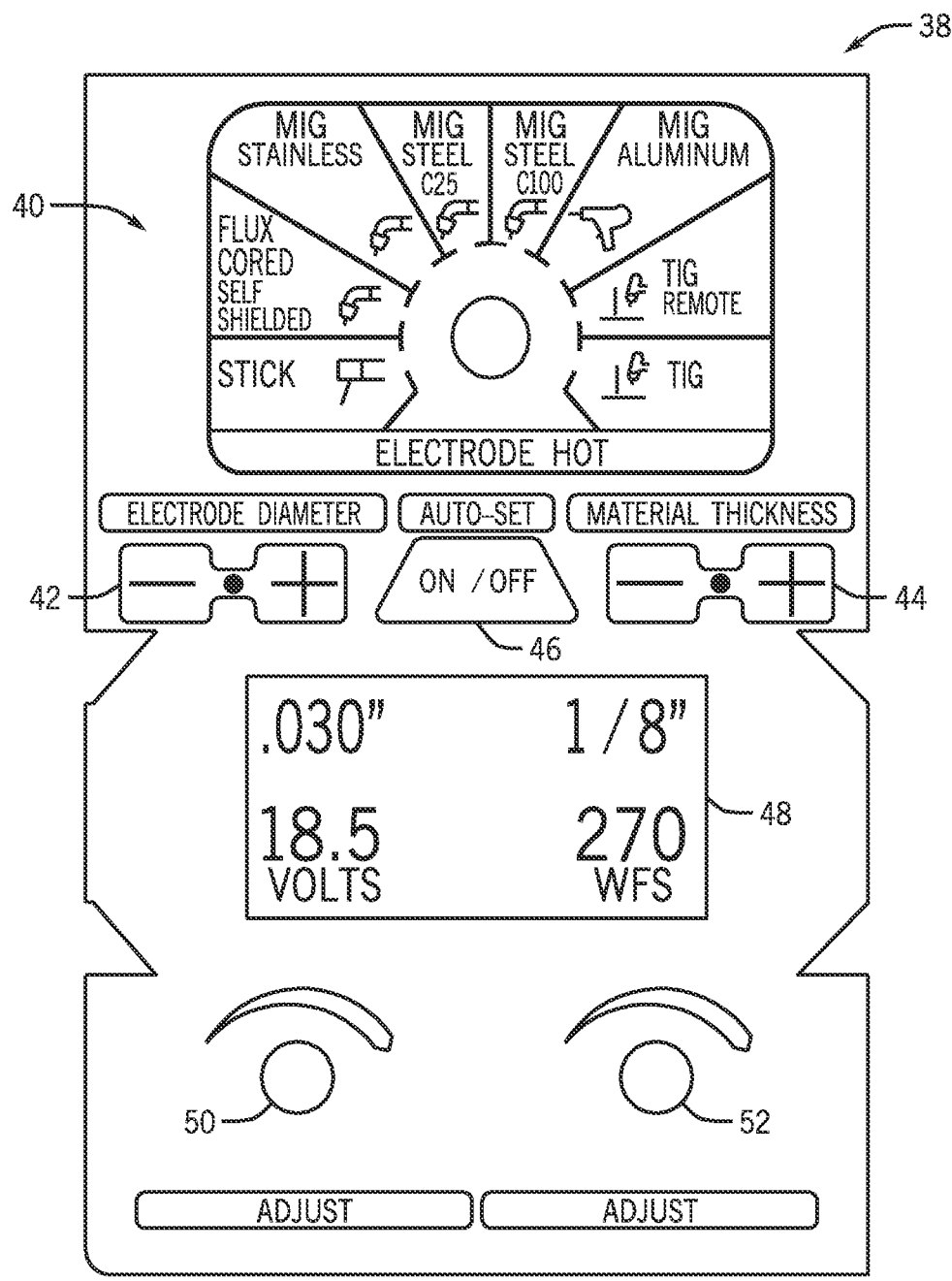
FIG. 2 is a front view of an embodiment of the interface for a MIG or flux cored welding process including auto-set welding parameters.

With the foregoing in mind, the welding process selector 40 may allow an operator or other user to select from a plurality of welding processes. For example, as depicted in FIG. 2, the welding process selector 40 may allow an operator to choose from welding processes, such as a stick welding process, a flux cored welding process, a metal inert gas (MIG) welding process, tungsten inert gas (TIG) welding process, and so forth. In addition to general welding processes, in certain embodiments, the welding process selector 40 may also allow the operator to select the material of the welding electrode. For example, as depicted in FIG. 2, in desiring to implement a MIG welding process, the operator may further select for example, a stainless steel, another type of steel, or aluminum electrode for implementing the MIG process. In one embodiment, the welding process selector 40 may also allow an operator to select a desired welding process (e.g., stick, MIG, TIG, etc.), electrode material type (e.g., steel, aluminum, etc.), and gas type (e.g., C25, C100, Argon, etc.), and subsequently elect to enable the auto-set function of the welding system 10 to automatically set the appropriate voltage and wire-feed speed and/or amperage welding parameters. The auto-set functionality is described in greater detail in U.S. Patent Application Publication Number 2007/0181553, which is herein incorporated by reference in its entirety.

As previously discussed, the user interface 38 may also include an electrode diameter adjustor 42. The electrode diameter is an important parameter in performing welds, as the suitable generated amperage of the welding arc is dependent upon the diameter of the electrode wire. In certain embodiments, the electrode diameter adjustor 42 may feature, for example, a "+" pushbutton to increase the electrode diameter setting and a "−" pushbutton to decrease the electrode diameter setting as depicted. Similarly, the user interface 38 may also include a material thickness adjustor 44, which may also, for example, include a "+" pushbutton to increase the material thickness setting (e.g., relating to a work piece 14 that is being welded upon) and a "−" pushbutton to decrease the material thickness setting. The electrode diameter and material thickness settings, in conjunction, have an effect on the voltage and amperage (i.e., electrical current) required to perform a given welding procedure. In certain embodiments, an operator or other user may select the auto-set function via the auto-set selector 46. When the auto-set feature is enabled, the operator may only be required to input the respective electrode diameter and material thickness settings for the power source 16 to automatically adjust (e.g., increase or decrease) voltage, wire-feed speed, and/or amperage parameters to appropriate settings.

The auto-set selector 46 may be, for example, an on/off electrical switch or on/off pushbutton, which may be activated or deactivated, allowing an operator to simply enable or disable the auto-set function of the welding system 10. In certain embodiments, the auto-set selector 46 may also include a light graphical indicator to indicate whether the auto-set function is enabled or disabled. For example, in performing a MIG welding process, the operator may select to enable the auto-set function, and the auto-set selector 46 may display a blue light, for example, or other graphical indicator to indicate to the operator that the auto-set function is enabled. Corresponding to the aforementioned electrode diameter adjustor 42, material thickness adjustor 44, and auto-set selector 46, the user interface 38 may include a display screen 48. The display screen 48 may be any display device capable of displaying visual graphical objects and/or alphanumeric texts relating to the setting of welding parameters, real-time operational statuses of the welding system 10, and so forth. For example, as depicted in FIG. 2, the display screen 48 may be a single liquid crystal display (LCD) screen capable of displaying a selected electrode diameter (e.g., 0.030"), material thickness (e.g., ⅛"), power source welding voltage (e.g., 18.5 volts), and wire-feed speed (e.g., 270 inches per minute).

In certain embodiments, the display screen 48 may automatically display acceptable ranges of values of welding voltage and wire-feed speed and/or amperage based upon inputs of the required electrode diameter and/or material thickness parameters (e.g., which are set based upon manipulation of the electrode diameter adjustor 42 and the material thickness adjustor 44). As used herein, an acceptable welding parameter value range may be a range of values within which the power source 16 holds the voltage and wire-feed speed and/or amperage in response to an entered or estimated value of the electrode diameter and material thickness parameters, such that a weld may be effectively executed. For example, as depicted in FIG. 2, a welding operator may input an electrode diameter of 0.030" and a material thickness of ⅛" via the user interface 38. The power source 16 may in response, for example, automatically set 18.5 volts and 270 inches per minute as appropriate welding parameter settings to effectively execute a weld for these particular electrode diameter and material thickness characteristics. The appropriate welding parameters may then be displayed via the display screen 48. The user interface 38 also includes welding parameter adjustment dials 50 and 52, which may be used to manually adjust (e.g., increase or decrease) the voltage and wire-feed speed parameters and/or amperage parameter within acceptable ranges of values, depending on the particular type of welding process selected using the welding process selector 40.

In certain embodiments, upon power-up of the welding system 10, a message may be automatically displayed via the display screen 48 prompting an operator, for example, to enable the auto-set function via the auto-set selector 46. In the case that the operator selects the auto-set function by activating the auto-set selector 46, one or more messages may subsequently prompt the operator to select both the electrode diameter and material thickness settings via the electrode diameter adjustor 42 and the material thickness adjustor 44, respectively. Similarly, messages may be automatically displayed via display screen 48 in the case, for example, an operator changes or switches welding processes via the welding process selector 40. These messages may be displayed to render further instructions to the operator to effectively execute the selected welding process. For example, if the welding process is switched from a TIG process to a MIG Steel C25 process, a message "PLEASE USE C25 GAS (75% AR/25% $CO_2$)" may automatically appear via the display screen 48. Likewise, in switching from the MIG Steel C25 process to a TIG Lift-arc Remote process, a message "PLEASE USE DCEN POLARITY 100% ARGON GAS" may automatically appear via the display screen 48. These features may provide supplemental guidance relating to appropriate welding settings (e.g., relating to shielding gases to be used, polarities to be used, and so forth) to operators or users of the welding system 10, and thus ensure that welds are performed appropriately.

As previously discussed, the auto-set function of the welding system 10 may be enabled or disabled via the auto-set selector 46 of the user interface 38. When auto-set is enabled, the power source 16 may automatically set welding voltage, welding amperage, and wire-feed speed for a plurality of welding processes, electrode material types, and shielding gas types. When auto-set is disabled, the power source 16 may determine acceptable ranges of values for the welding voltage, welding amperage, and wire-feed speed, thus allowing an operator to manually adjust the parameters within the acceptable ranges of values. For purposes of illustration, the aforementioned auto-set function will be discussed with respect to MIG or flux cored welding processes, stick welding processes, and TIG welding processes, as depicted by FIGS. 2-25.

In an embodiment, the auto-set selector 46 of the user interface 38 may be enabled to automatically set welding voltage and wire-feed speed parameters for a MIG or flux cored welding process. In a MIG welding process, the appropriate setting of the welding voltage and wire-feed speed parameters may be of particular importance, as the welding voltage generally determines the height and width of the weld bead, and the amperage of the weld arc is generally dependent upon the speed of the wire-feed. In the case that the auto-set selector 46 is enabled, the operator may then select electrode diameter and material thickness via the electrode diameter adjustor 42 and the material thickness adjustor 44, respectively. The welding power source 16 may then automatically determine the acceptable voltage and wire-feed speed parameters. For example, as depicted within the display screen 48 of FIG. 2, which displays the MIG standby state, 0.030" represents an entered value of the electrode diameter, ⅛" represents an entered value of the material thickness, and 18.5 volts and 270 inches per minute represent the automatically determined acceptable range of values for the welding voltage and wire-feed speed parameters, respectively.

Figure 3:
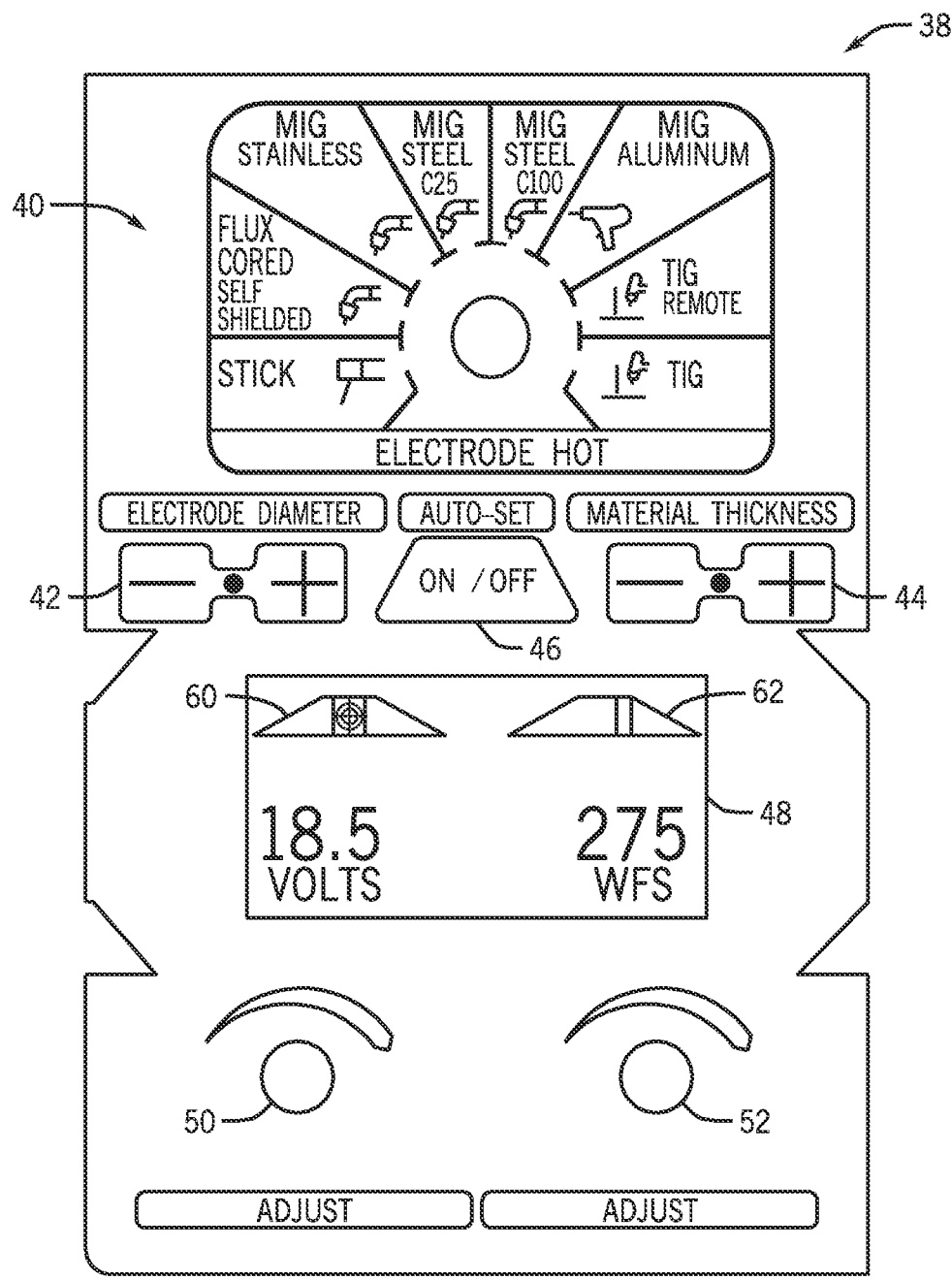
FIG. 3 is a front view of an embodiment of the interface for a MIG or flux cored adjust state including auto-set welding parameters and graphical range indicators.

The display screen 48 may then display graphical range indicators 60 and 62, for example, as depicted in FIG. 3, which displays the MIG adjust state, in which the graphical range indicators 60 and 62 depict (e.g., display varying colors and/or movement of a range bar) whether the welding voltage and/or wire-feed speed parameters are in the acceptable ranges of values as an operator adjusts one or both of the welding parameter adjustment dials 50 and 52. In certain embodiments, the MIG adjust state of FIG. 3 may revert to the MIG standby state of FIG. 2 after a certain amount of time (e.g., a predetermined amount of time, which may be a setting of the user interface 38) elapses subsequent to the operator ceasing to adjust the particular parameter adjustment dial 50 and 52.

As such, when the operator makes adjustments via one (or both) of the welding parameter adjustment dials 50 and 52, the graphical range indicators 60 and 62 (which relate to the parameters being adjusted by the welding parameter adjustment dials 50 and 52, respectively) on the display screen 48 depict acceptable ranges of values for their respective welding parameters (e.g., voltage and wire-feed speed in the embodiment illustrated in FIG. 3). In general, when one of the welding parameter adjustment dials 50 and 52 is manipulated (e.g., the welding parameter adjustment dial 52 relating to wire-feed speed being adjusted in FIG. 3), an acceptable range of values for the related welding parameter (e.g., wire-feed speed in FIG. 3) is illustrated on the display screen 48, and a slider indicating the current value (e.g., the slider of the graphical range indicator 62) is shown within the acceptable range, whereas an acceptable range of values for the other welding parameter (e.g., voltage in FIG. 3) is illustrated on the display screen 48, and an indication that that welding parameter is being held constant (e.g., the reticle of the graphical range indicator 60) is shown within the acceptable range. In certain embodiments, when one welding parameter is adjusted, the other welding parameter is held substantially constant. In addition, in certain embodiments, the welding parameter adjustment dials 50 and 52 may be configured to only accept values that fall within the acceptable ranges of values for the welding parameters.

Conversely, in the case that the auto-set selector 46 is disabled, the operator may then manually adjust (e.g. increase or decrease) the welding voltage and wire-feed speed parameters within an acceptable range of values (e.g., by manipulating the welding parameter adjustment dials 50 and 52, which correspond to the parameter displayed on the display screen 48 directly above respective welding parameter adjustment dial 50 and 52).

Figure 4:
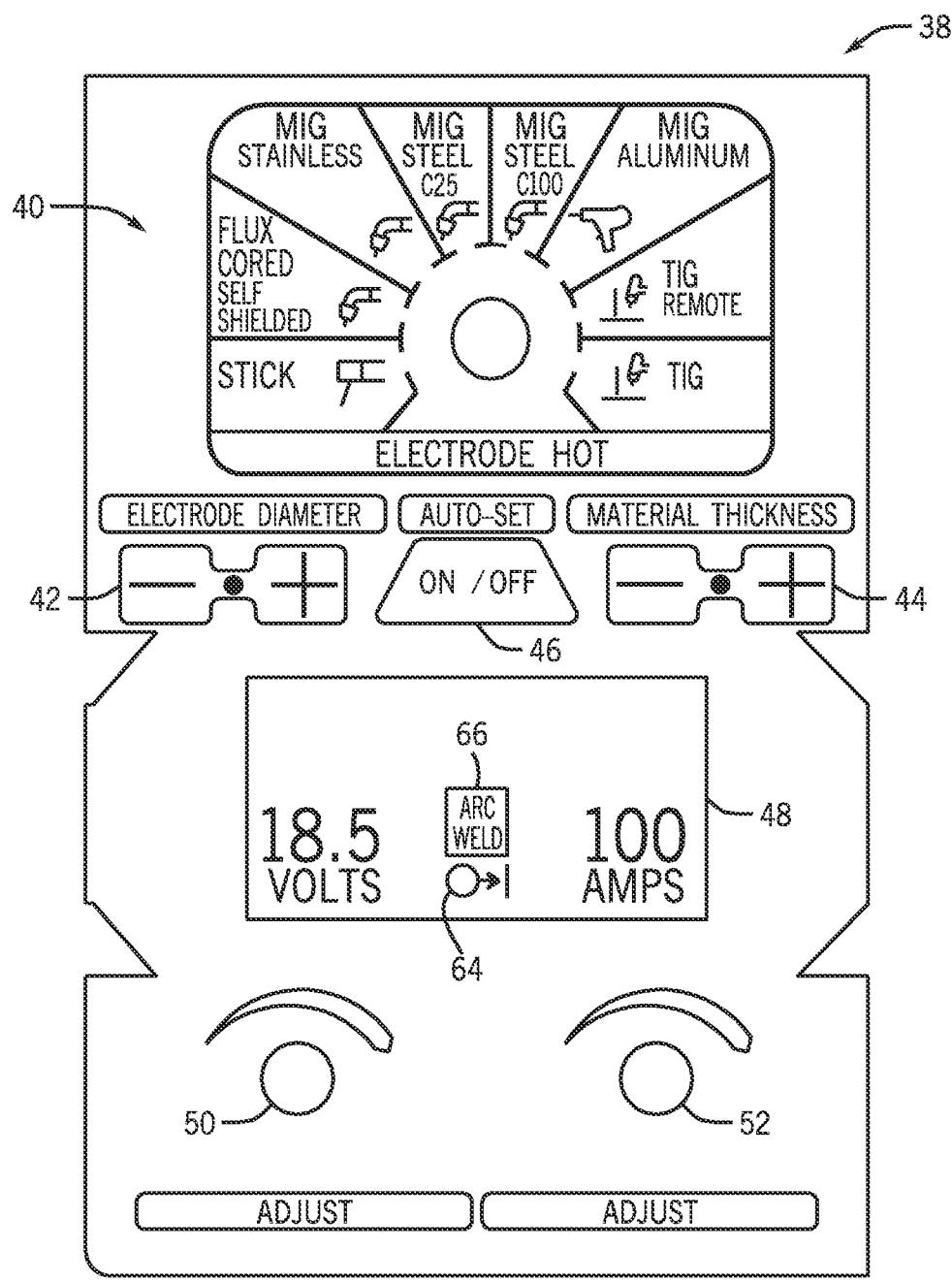
FIG. 4 is a front view of an embodiment of the interface for a MIG or flux cored weld state including auto-set welding parameters and output and arc weld graphical indicators.
Figure 5:
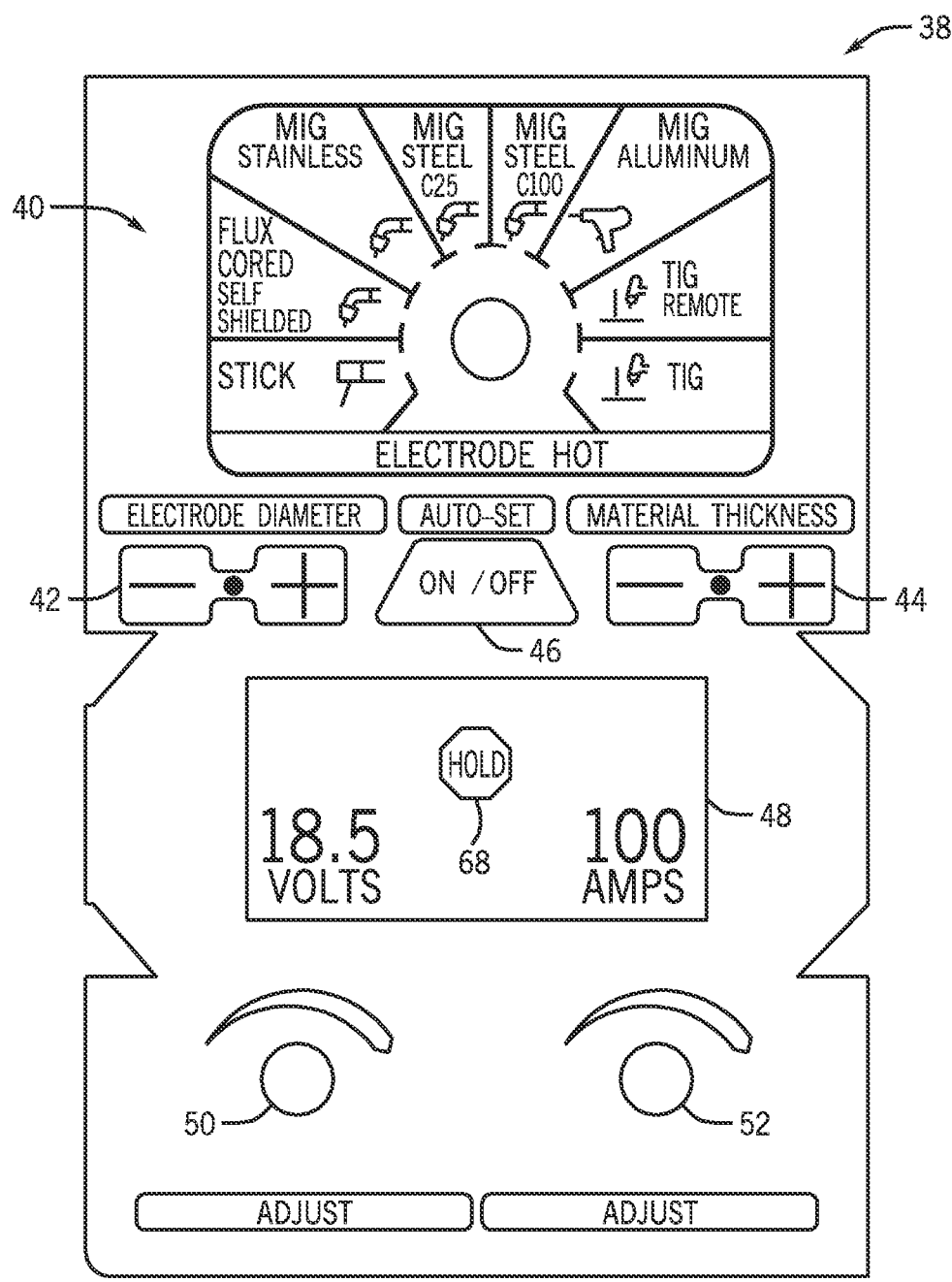
FIG. 5 is a front view of an embodiment of the interface for a MIG or flux cored hold state including auto-set welding parameters and a hold graphical indicator.
Figure 6:
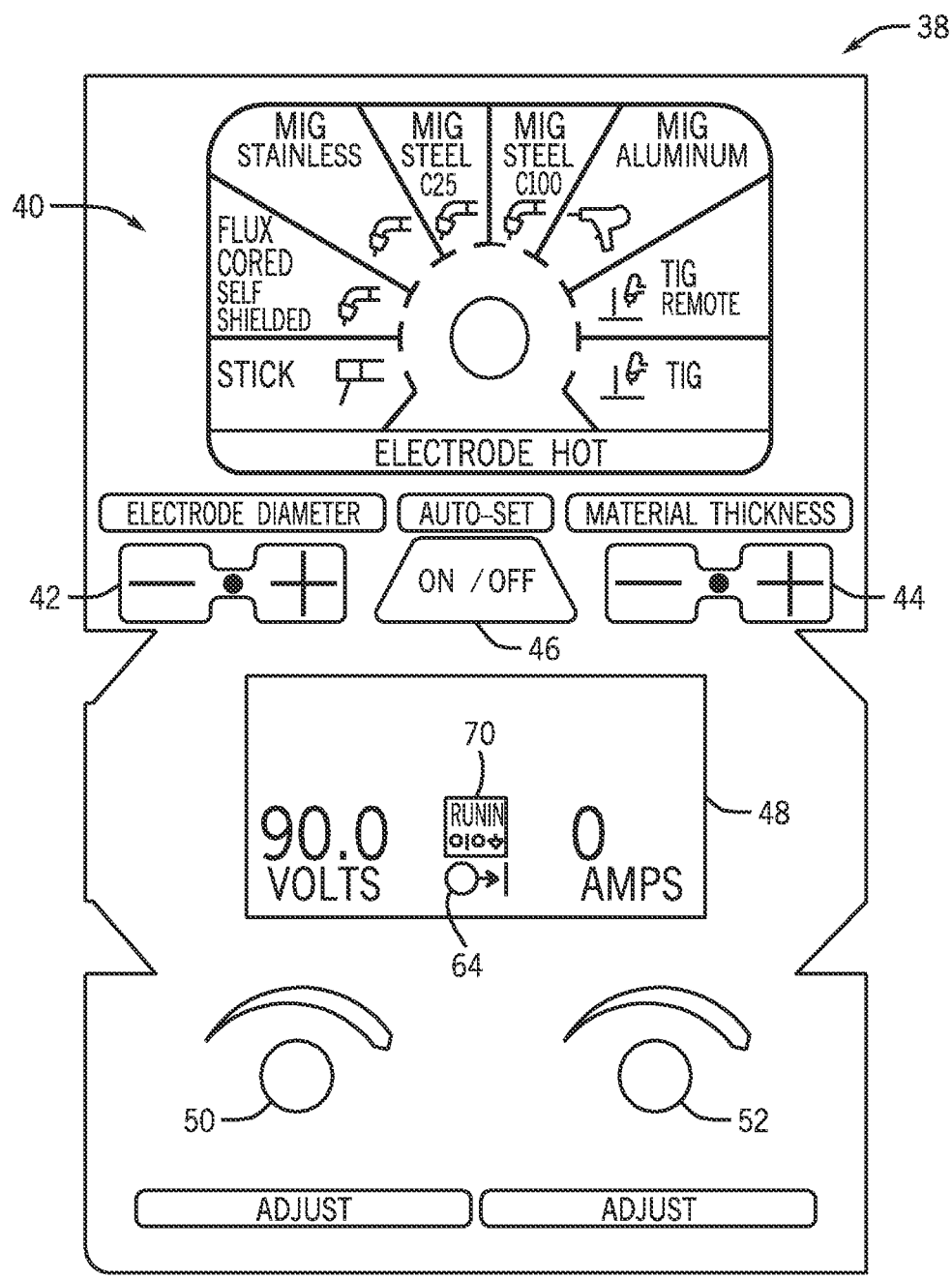
FIG. 6 is a front view of an embodiment of the interface for a MIG or flux cored OCV state including auto-set welding parameters and a run-in speed graphical indicator.
Figure 7:
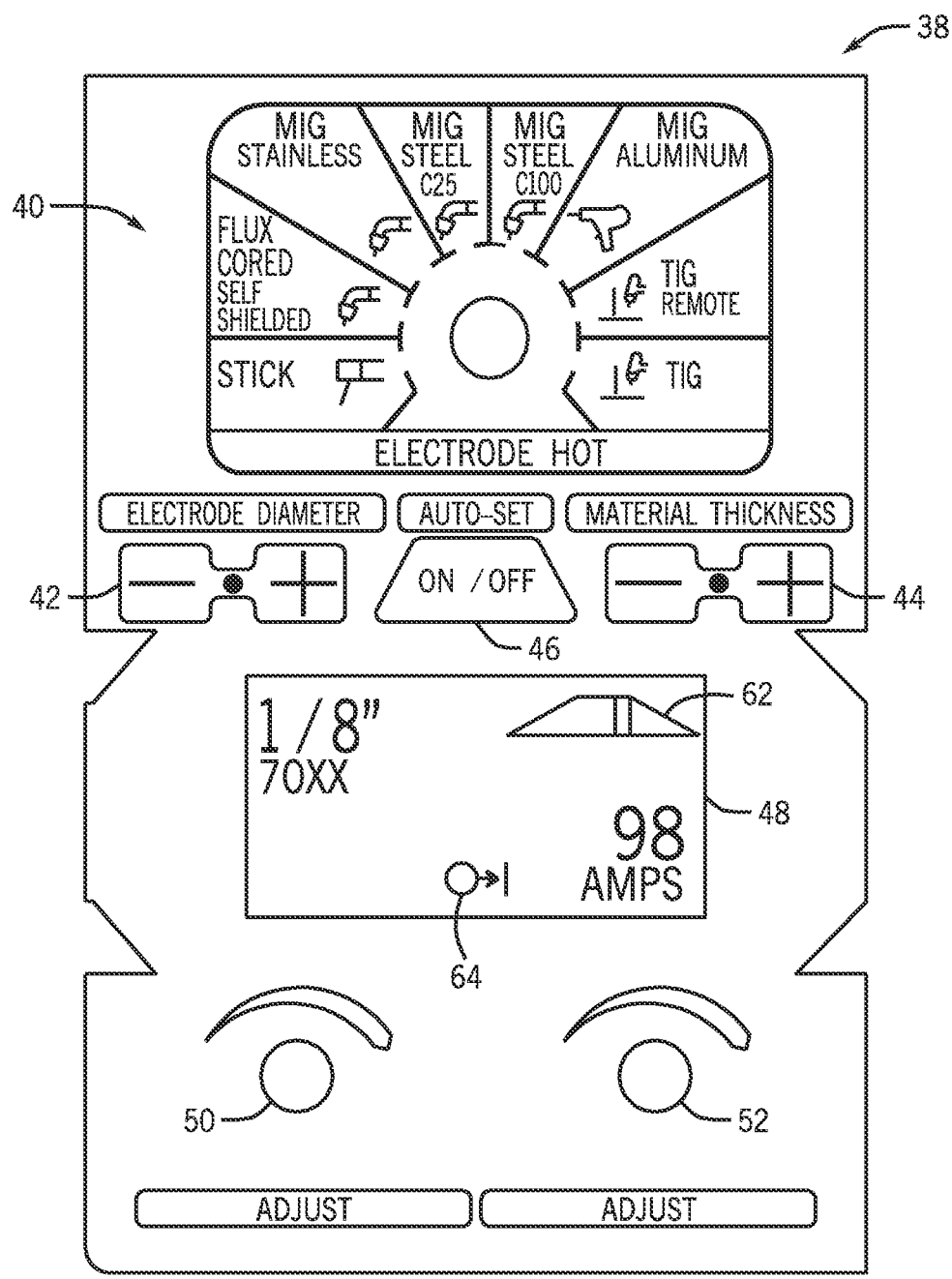
FIG. 7 is a front view of an embodiment of the interface for a stick adjust state including auto-set welding parameters and output and range graphical indicators.

The display screen 48 of FIG. 4 displays the MIG weld state, in which the welding voltage (e.g., 18.5 volts) and the welding amperage (e.g., 100 amps) are displayed on the display screen 48 while an operator or user executes a weld. An output graphical indicator 64 indicates that there is currently an output of power from the power source 16, and an arc weld graphical indicator 66 indicates that the power source 16 is sustaining a welding arc. Hence, the output graphical indicator 64 and the arc weld graphical indicator 66 may each further indicate to an operator, for example, that the welding voltage, welding amperage, and wire-feed speed parameters are within acceptable ranges of values. The display screen 48 may also continue to display the welding parameters for a duration of time after a weld is completed and/or terminated. For example, as depicted in FIG. 5, the display screen 48 may assume a hold state (e.g., indicated by a hold state indicator 68) for a duration of time after a weld completion or termination, such that the operator, for example, may note the preceding operating welding voltage and welding amperage parameters. Similarly, the display screen 48 of FIG. 6 displays the MIG open circuit voltage (OCV) state, in which the output graphical indicator 64 signals that there is currently an output power from the power source 16. However, no welding arc is generated at the depicted parameter settings. A run-in graphical indicator 70 signals the wire-feed speed is at run-in speed, which is the speed of the wire-feed from the time the trigger 24 of the welding torch 12 is depressed until the initiation of a welding arc.

In other embodiments, the auto-set selector 46 of the user interface 38 may be enabled to automatically set welding amperage for stick and TIG welding processes. In a stick or TIG welding process, the appropriate setting of the welding amperage (i.e., electrical current) may be of paramount significance, as the welding amperage and material thickness, in particular, determines the intensity of the welding arc. Henceforth, FIGS. 7-10 are discussed for the purpose of illustration of the stick welding process, FIGS. 11-17 are discussed for the purpose of illustration of the TIG welding process, and similarly, FIGS. 18-25 are discussed for the purpose of illustration of the TIG remote welding process.

Similar to the previously discussed MIG process, in the case that the auto-set selector 46 is enabled, the operator may then select electrode diameter and material thickness via the electrode diameter adjustor 42 and the material thickness adjustor 44, respectively. The welding power source 16 may then automatically determine the acceptable amperage parameters. For example, as depicted within the display screen 48 of FIG. 7, which displays the stick adjust state, ⅛" represents an entered value of the electrode diameter, and 98 amps represents the adjusted amperage parameter. The output graphical indicator 64 signals an output of the power source 16, and the graphical range indicator 62 indicates the acceptable range of values for the amperage parameter as an operator, for example, makes adjustments to the amperage parameter via the welding parameter adjustment dial 52.

As such, when the operator adjusts the amperage parameter via the welding parameter adjustment dial 52, the acceptable range of values for the amperage parameter is illustrated on the display screen 48, and a slider indicating the current value (e.g., the slider of the graphical range indicator 62) is shown within the acceptable range. Again, in certain embodiments, the welding parameter adjustment dial 52 is configured to only accept values that fall within the acceptable ranges of values for the amperage parameter, which may be determined based on the other parameters input via the user interface 38 (e.g., welding process type input via the welding process selector 40, electrode diameter input via the electrode diameter adjustor 42, material thickness input via the material thickness adjustor 44, and so forth, or a combination thereof) when auto-set is enabled (e.g., via activation of the auto-set selector 46).

Figure 8:
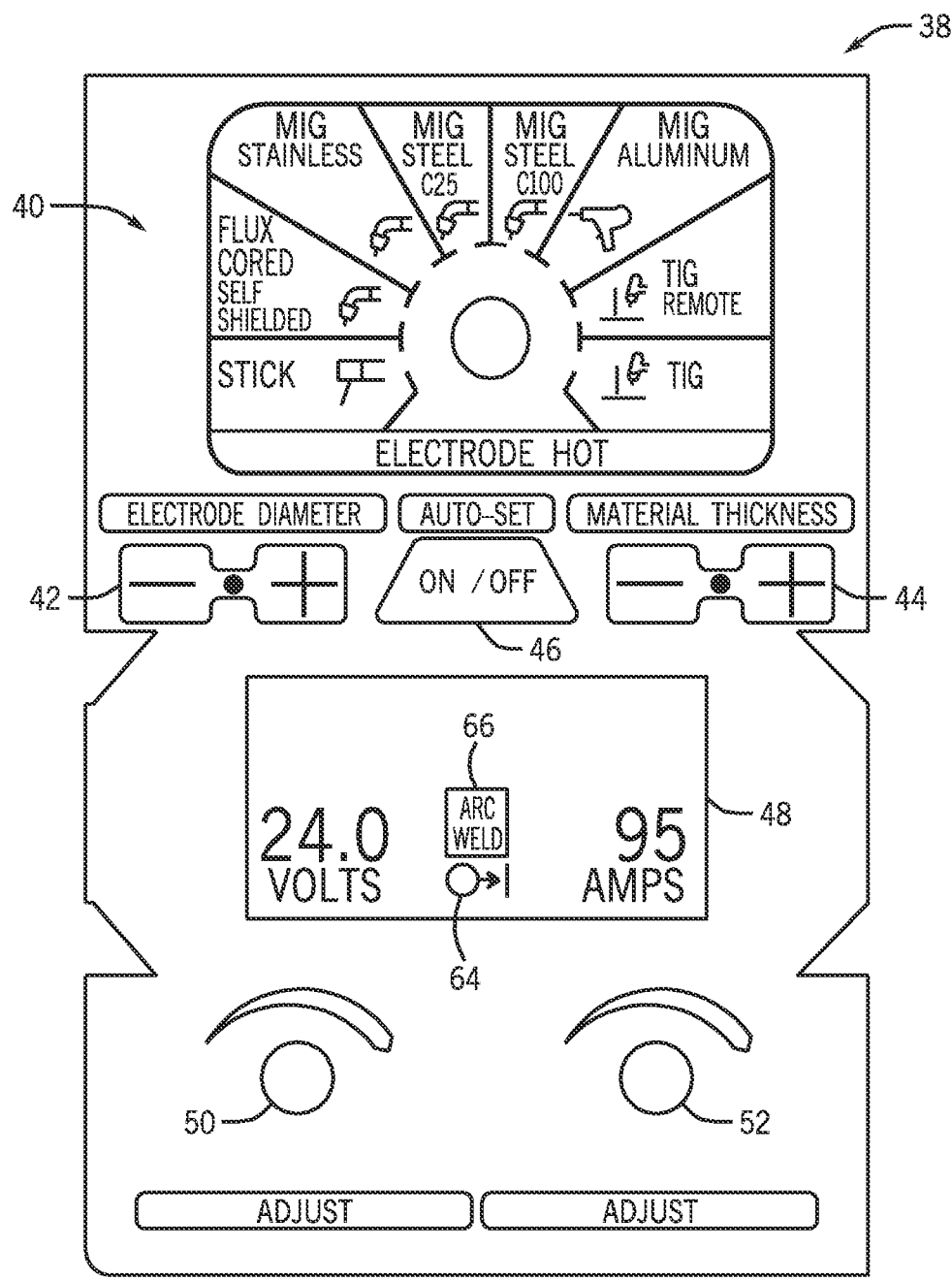
FIG. 8 is a front view of an embodiment of the interface for a stick weld state including auto-set welding parameters and output and arc weld graphical indicators.
Figure 9:
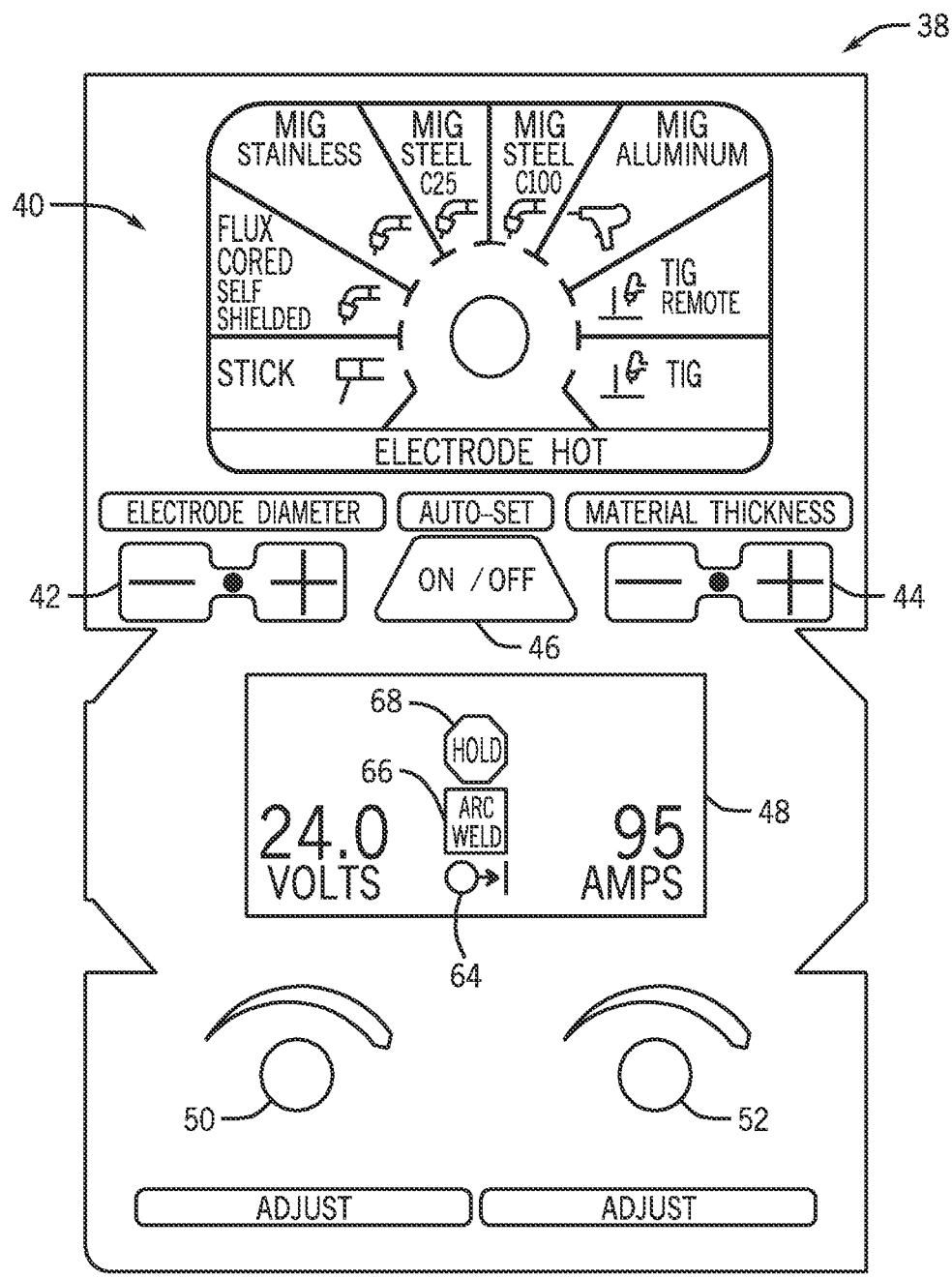
FIG. 9 is a front view of an embodiment of the interface for a stick hold state including auto-set welding parameters and hold, output, and arc weld graphical indicators.
Figure 10:
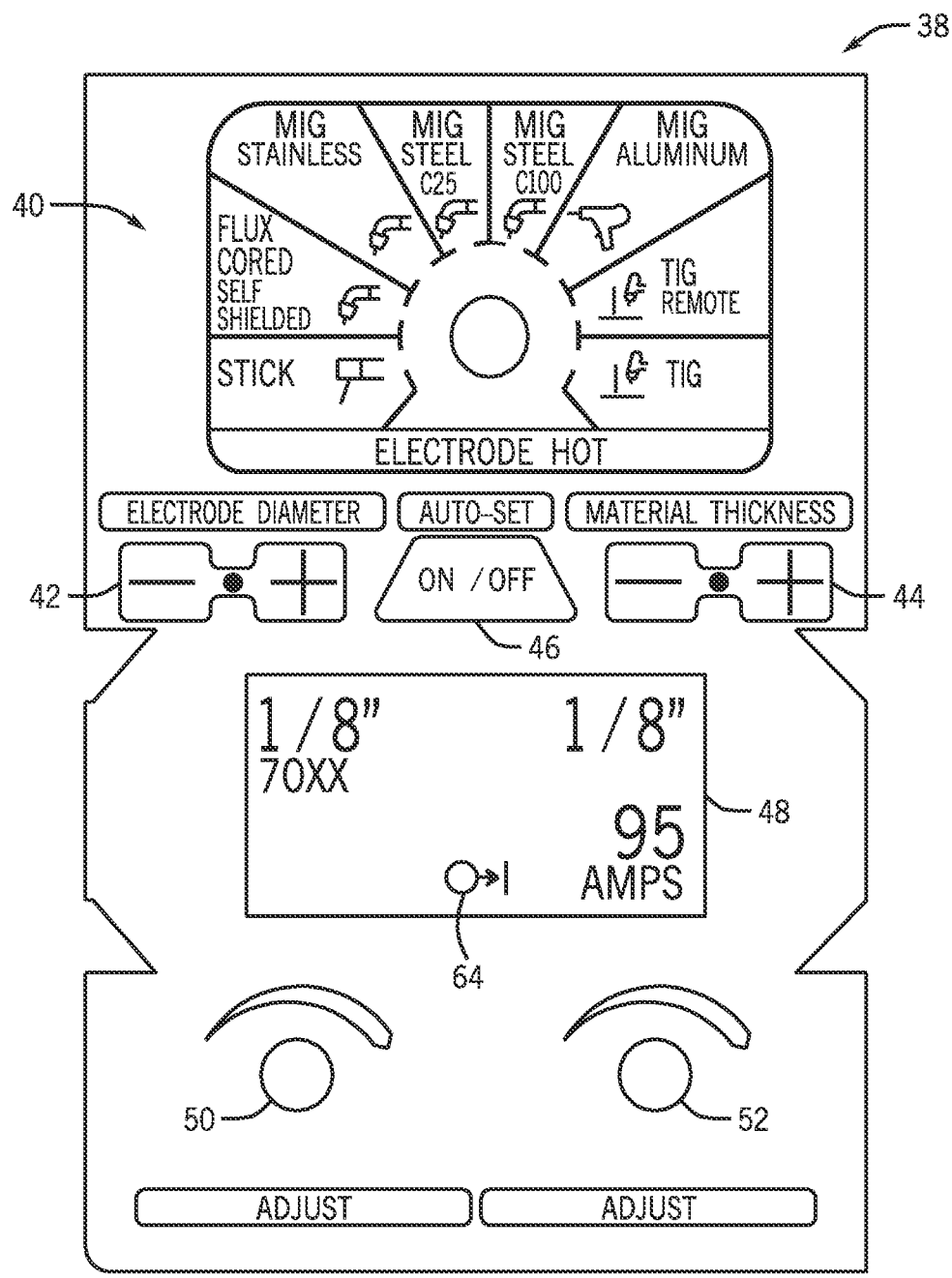
FIG. 10 is a front view of an embodiment of the interface for a stick OCV state including auto-set welding parameters and an output graphical indicator.
Figure 11:
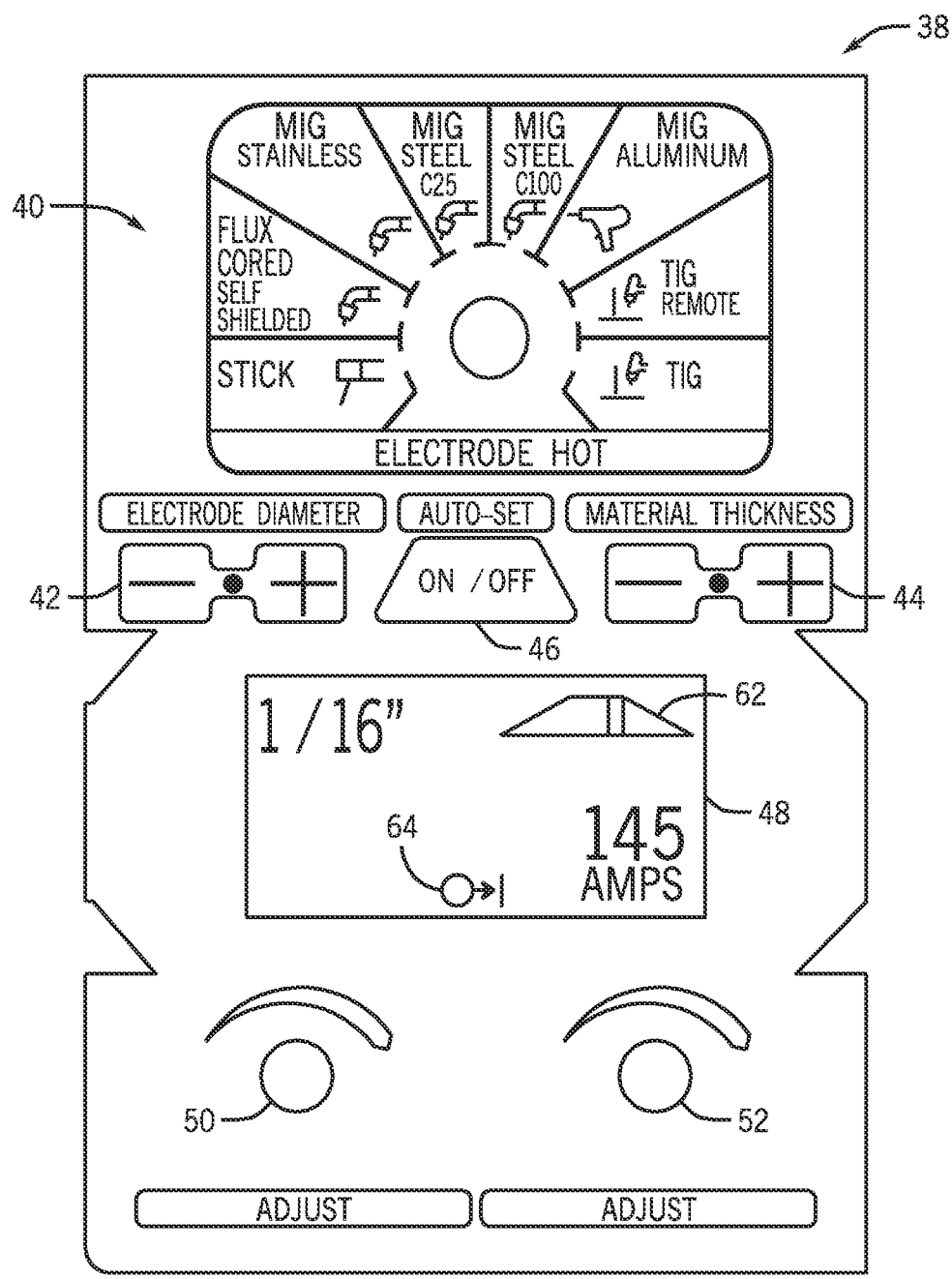
FIG. 11 is a front view of an embodiment of the interface for a TIG adjust state including auto-set welding parameters and output and range graphical indicators.
Figure 12:
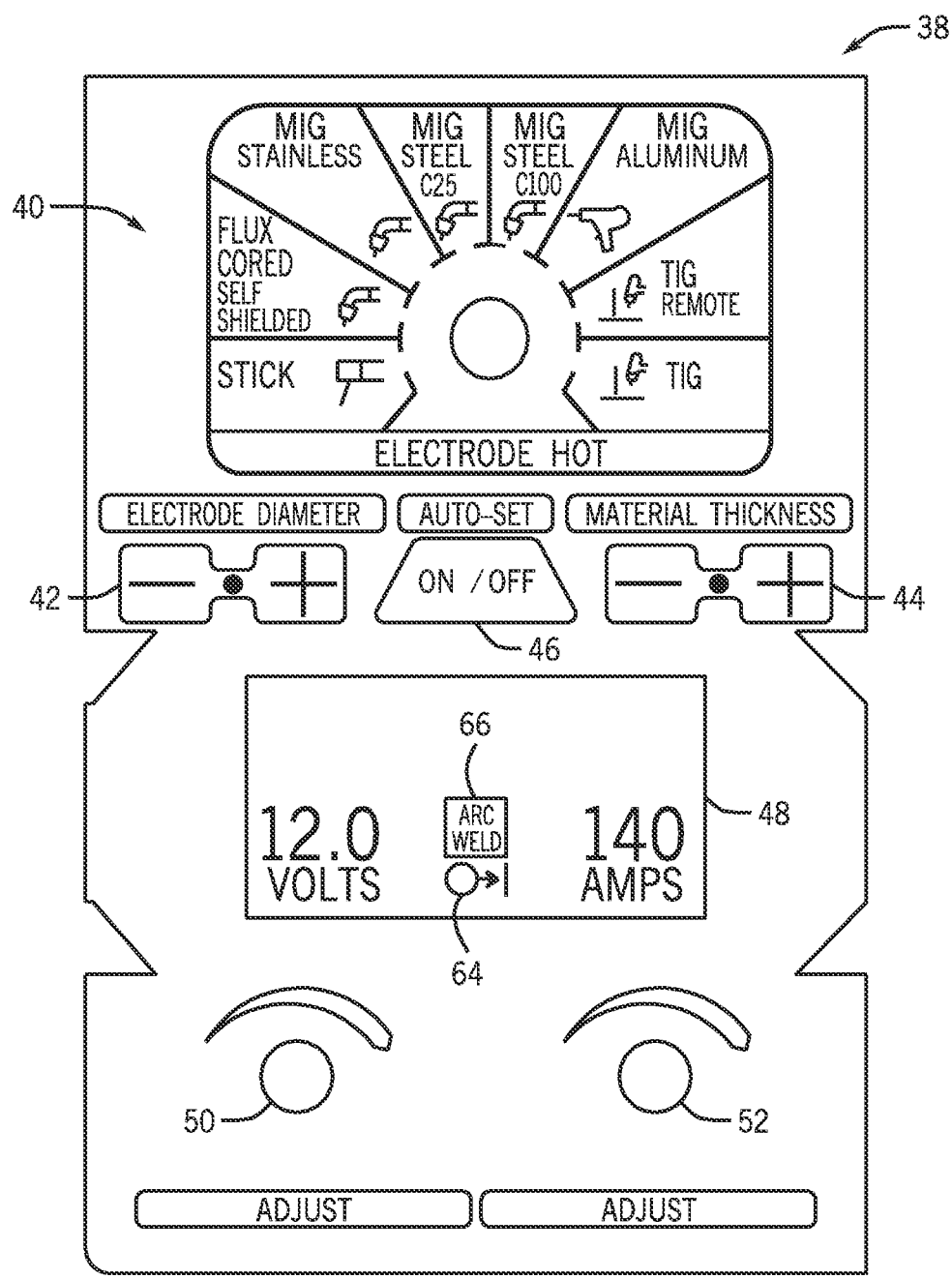
FIG. 12 is a front view of an embodiment of the interface for a TIG weld state including auto-set welding parameters and output and arc weld graphical indicators.
Figure 13:
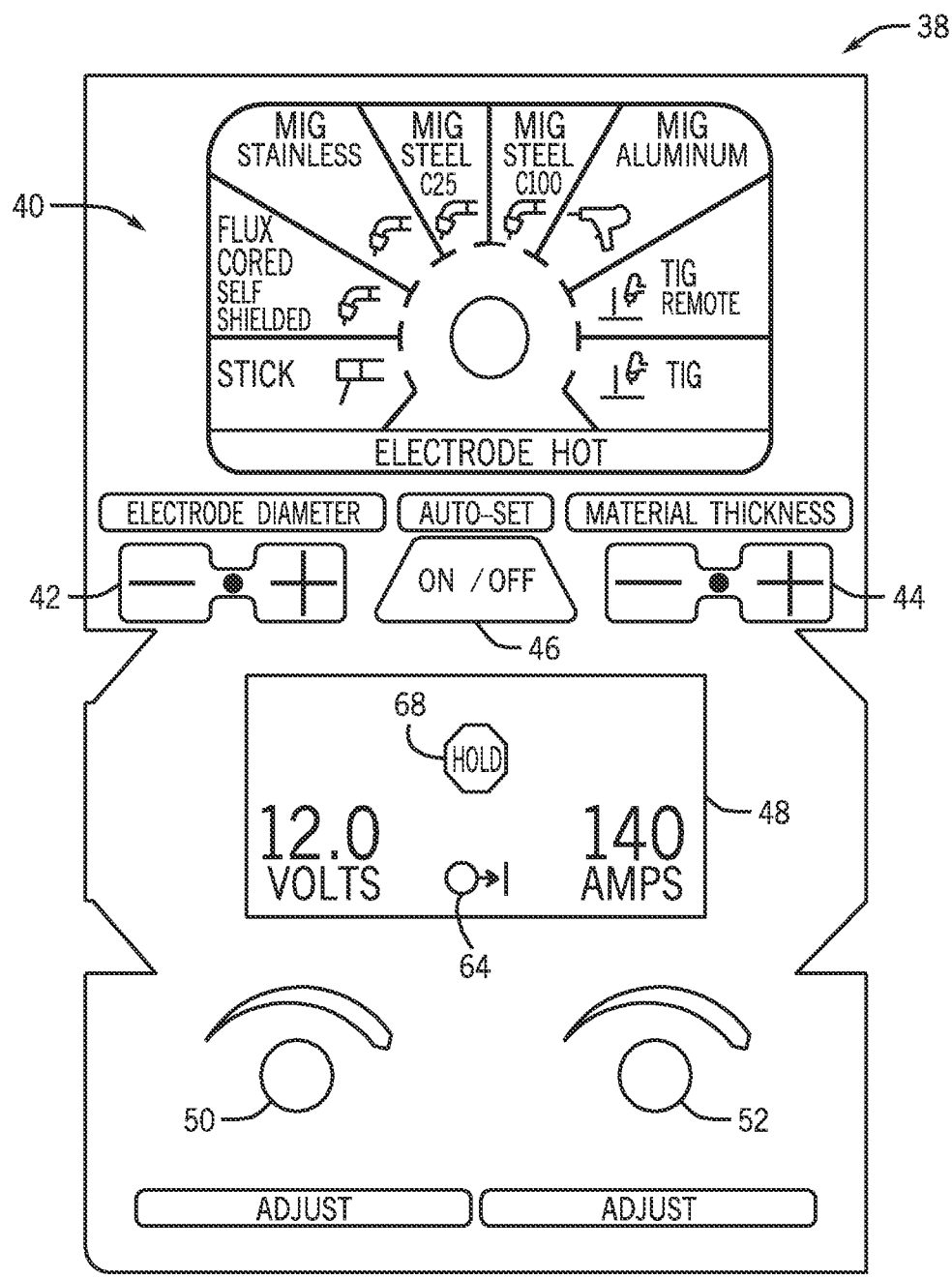
FIG. 13 is a front view of an embodiment of the interface for a TIG hold state including auto-set welding parameters and output and a hold graphical indicators.

FIG. 8 displays the stick weld state, in which, for example, output power at 24 volts and 95 amps is sustained from the power source 16 while an operator or user executes a weld. FIG. 9 displays the stick hold state, in which, for example, the display screen 48 maintains display of the previous state for a duration of time after a weld completion or termination. FIG. 10 displays the stick open circuit voltage (OCV) state, in which the output graphical indicator 64 indicates that there is currently an output voltage from the power source 16. However, no welding arc is generated at the depicted parameter settings.

Figure 14:
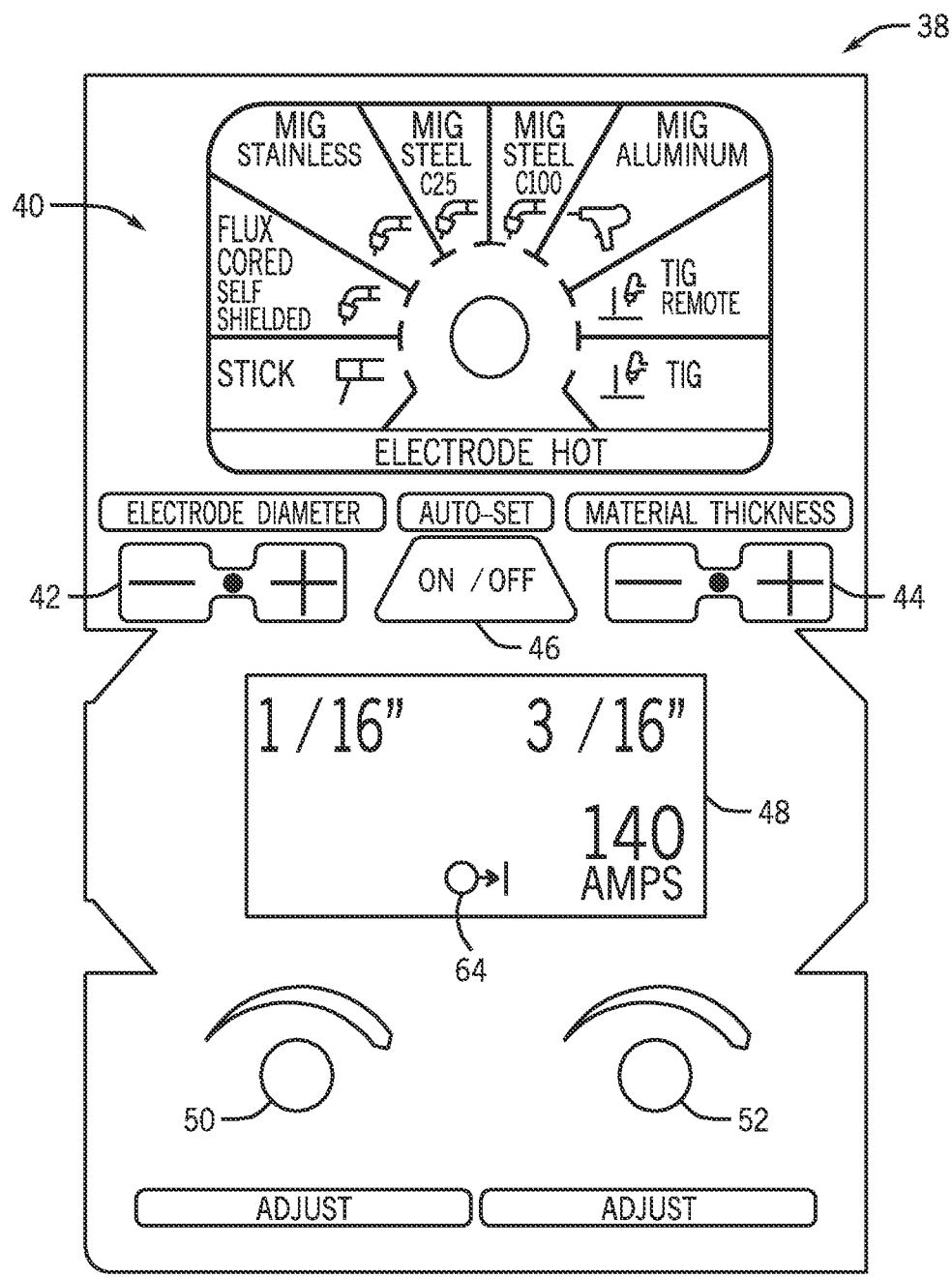
FIG. 14 is a front view of an embodiment of the interface for a TIG OCV state including auto-set welding parameters and an output graphical indicator.

As noted above, a TIG and/or TIG remote welding process may depend heavily on the material thickness and the amperage welding parameter. The TIG process typically features a non-consumable tungsten electrode to generate a weld, in which the tungsten electrode is guarded by an inert shielding gas. Further, in comparison to previously discussed welding processes (e.g., MIG, flux cored, stick, etc.), the TIG process may require that additional welding parameters and characteristics be monitored and communicated to an operator of welding system 10. With the foregoing in mind, similar to the other welding processes, the display screen 48 illustrated in FIG. 11 displays the TIG adjust state, and FIG. 12 displays the TIG weld state. Like the other welding processes, the TIG weld state is the state in which the appropriate voltage (e.g., 12.0 volts) and welding amperage (e.g., 140 amps) are displayed while an operator or user executes a weld. The display screen 48 illustrated in FIG. 13 displays the TIG hold state, which continues for a duration of time after a weld completion or termination, such that the operator, for example, may note the preceding operating welding voltage and welding amperage parameters. FIG. 14 displays the TIG open circuit voltage (OCV) state, in which again the output graphical indicator 64 indicates that there is currently a power output on power source 16, but that no welding arc is being maintained.

Figure 15:
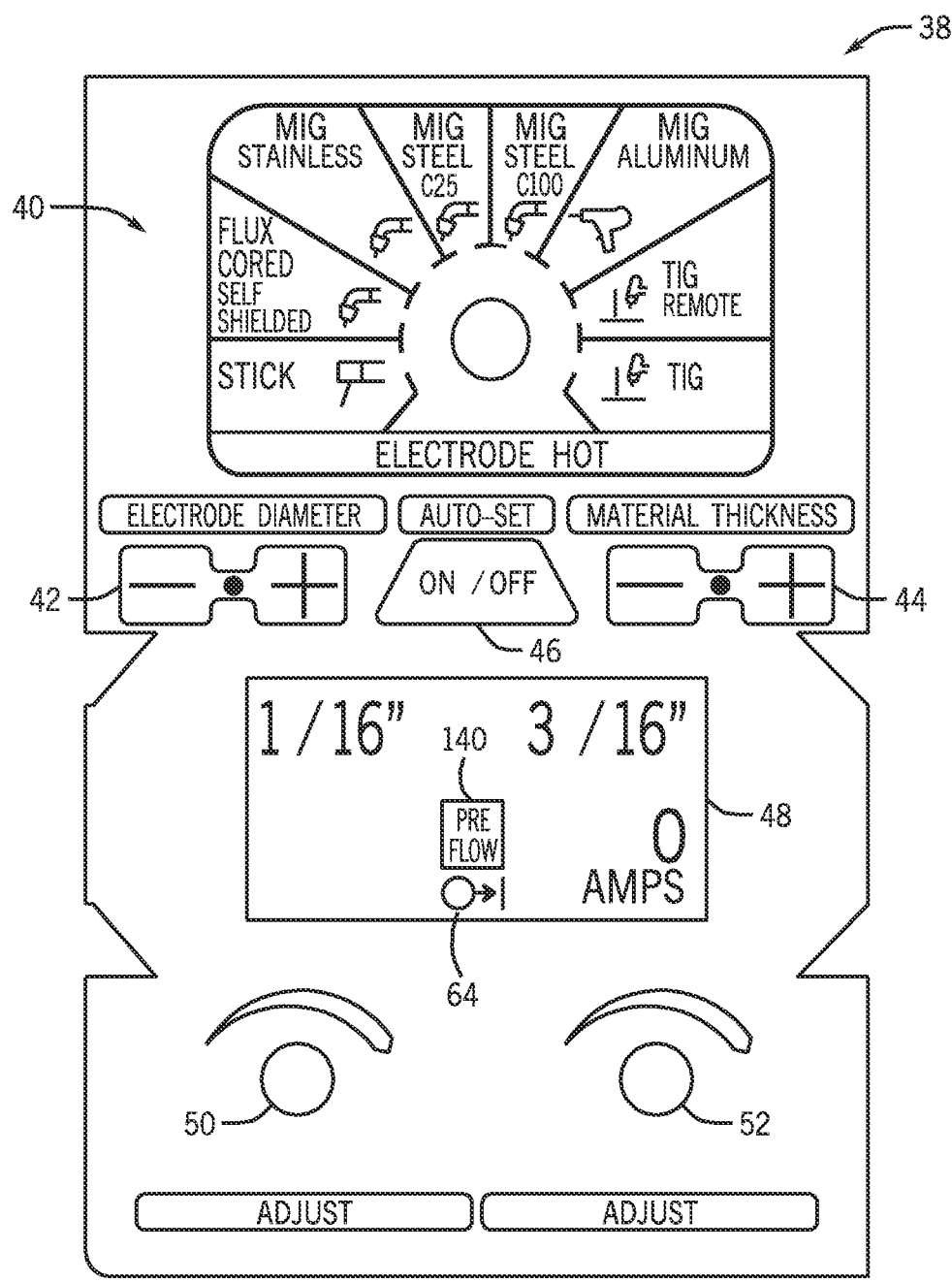
FIG. 15 is a front view of an embodiment of the interface for a TIG pre-flow state including auto-set welding parameters and output and pre-flow graphical indicators.
Figure 16:
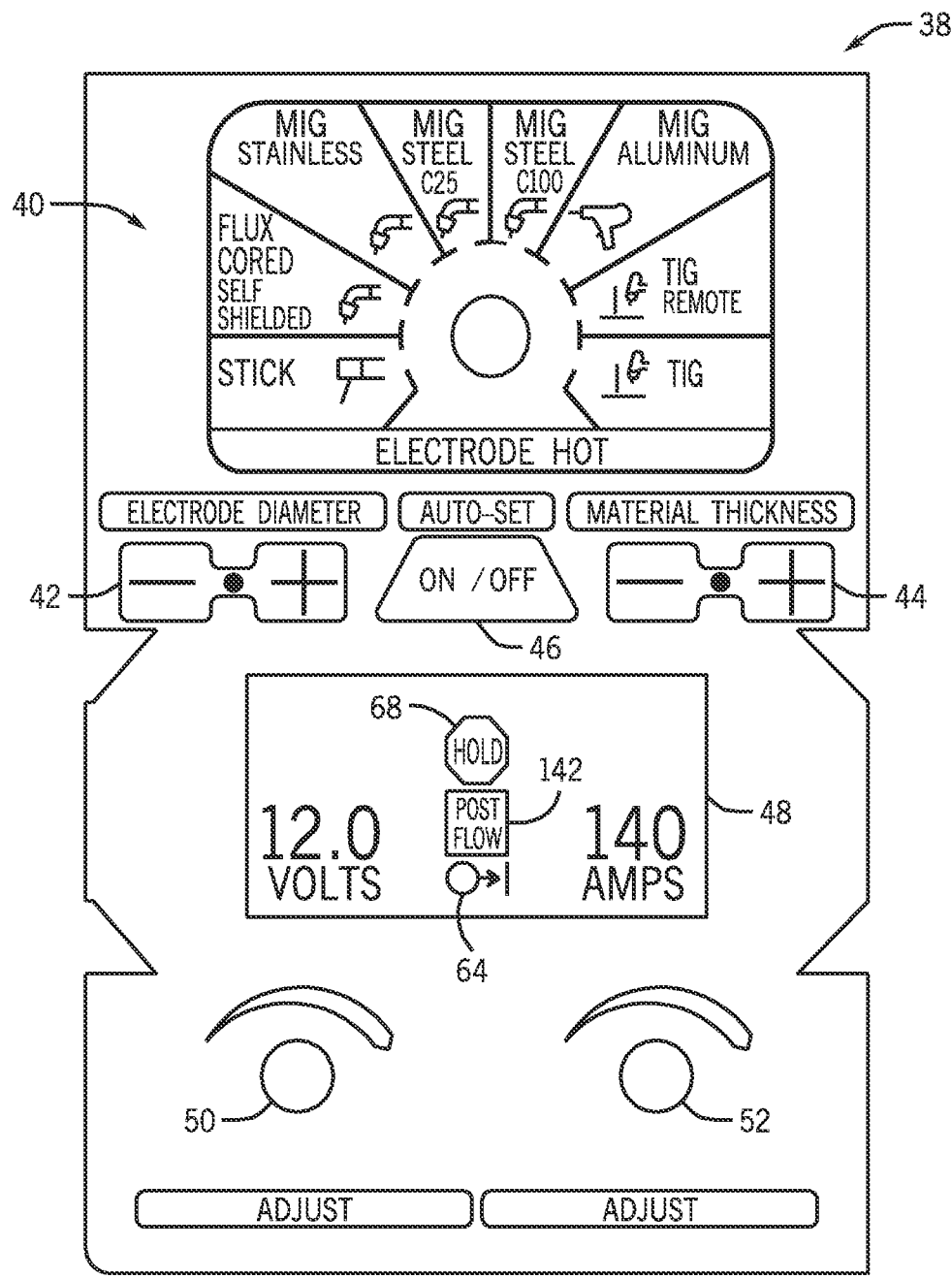
FIG. 16 is a front view of an embodiment of the interface for a TIG post-flow state including auto-set welding parameters and hold, output, and post-flow graphical indicators.
Figure 17:
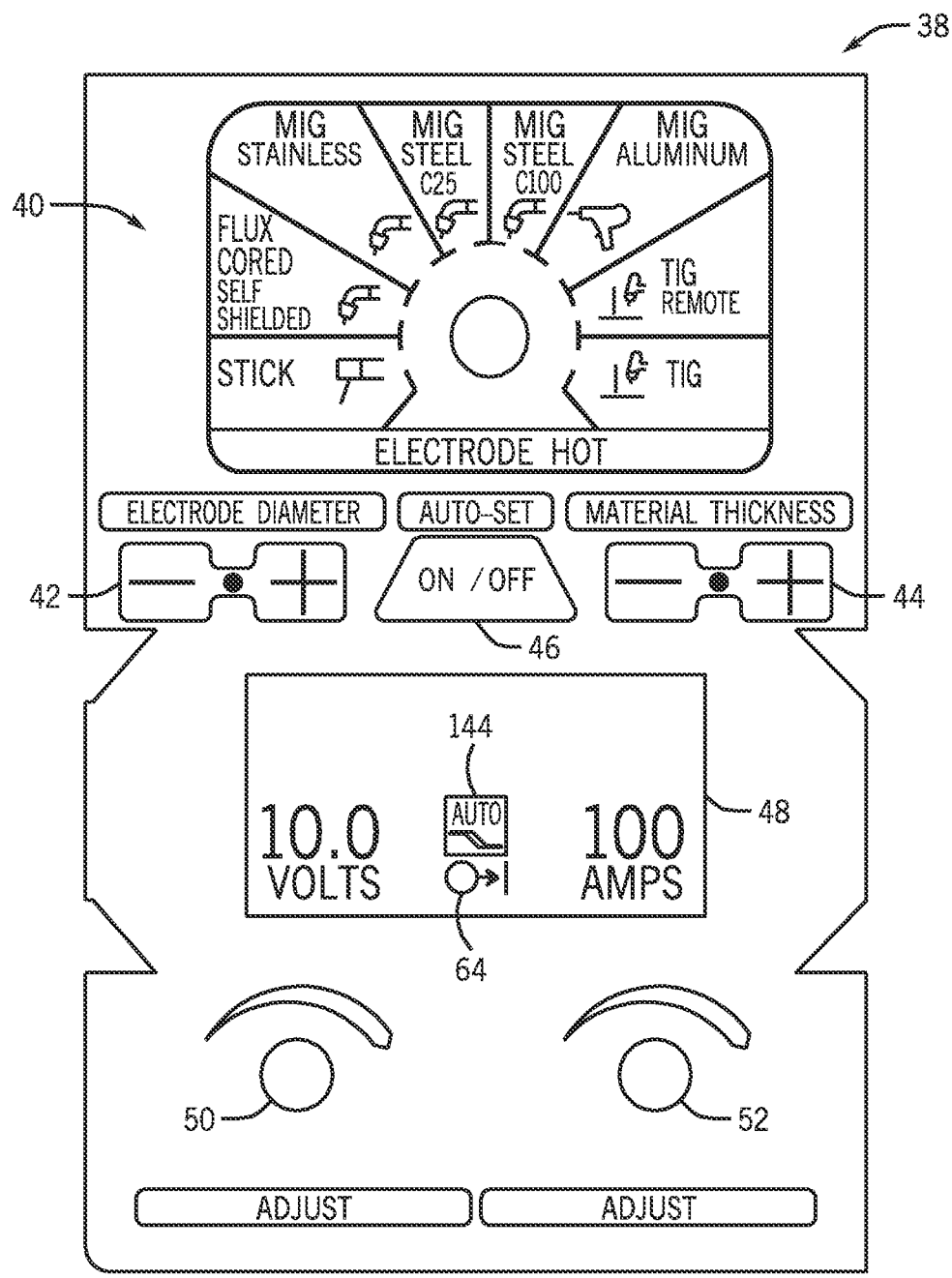
FIG. 17 is a front view of an embodiment of the interface for a TIG crater state including auto-set welding parameters and auto crater and output graphical indicators.

As depicted in FIG. 15, and disparate from the previously discussed welding processes, the TIG auto-set function may include a pre-flow state and a post-flow state. The TIG pre-flow state is the state in which inert gas flows prior to the generation of a welding arc to displace and shield the area of the arc before ignition. For example, as depicted within the display screen 48 illustrated in FIG. 15, the electrode diameter and material thickness may be respectively set at ¹⁄₁₆" and ³⁄₁₆" inches, while the amperage parameter remains at 0 amps. A pre-flow graphical indicator 140 may automatically indicate to an operator that the inert gas has begun to flow prior to the generation of the welding arc. FIG. 16 depicts the TIG post-flow state, where the voltage is 12 volts, the amperage is 140 amps, and a post-flow graphical indicator 142 automatically indicates the post-flow state. FIG. 17 displays the TIG crater state, which is the state in which the amperage, for example, is automatically ramped (i.e., decremented) from the welding amperage to a minimum amperage to terminate the weld. For example, as illustrated within the display screen 48 illustrated in FIG. 17, the welding voltage (e.g., 10.0 volts) and amperage (e.g., 100 amps) may both be automatically ramped from the operating welding levels. This may be automatically indicated to an operator, for example, via a crater graphical indicator 144.

Figure 18:
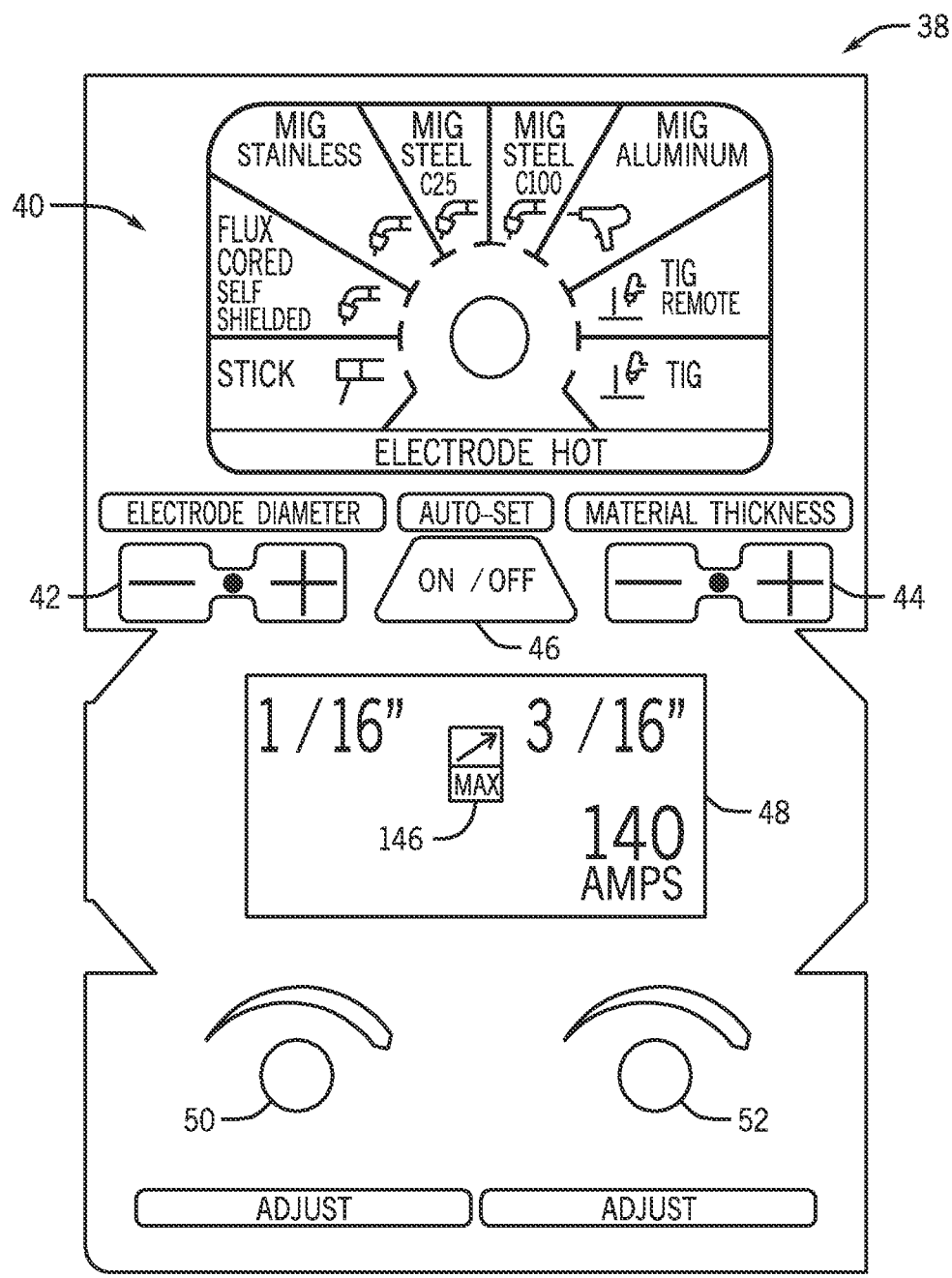
FIG. 18 is a front view of an embodiment of the interface for a TIG remote standby state including auto-set welding parameters and a remote graphical indicator.
Figure 19:
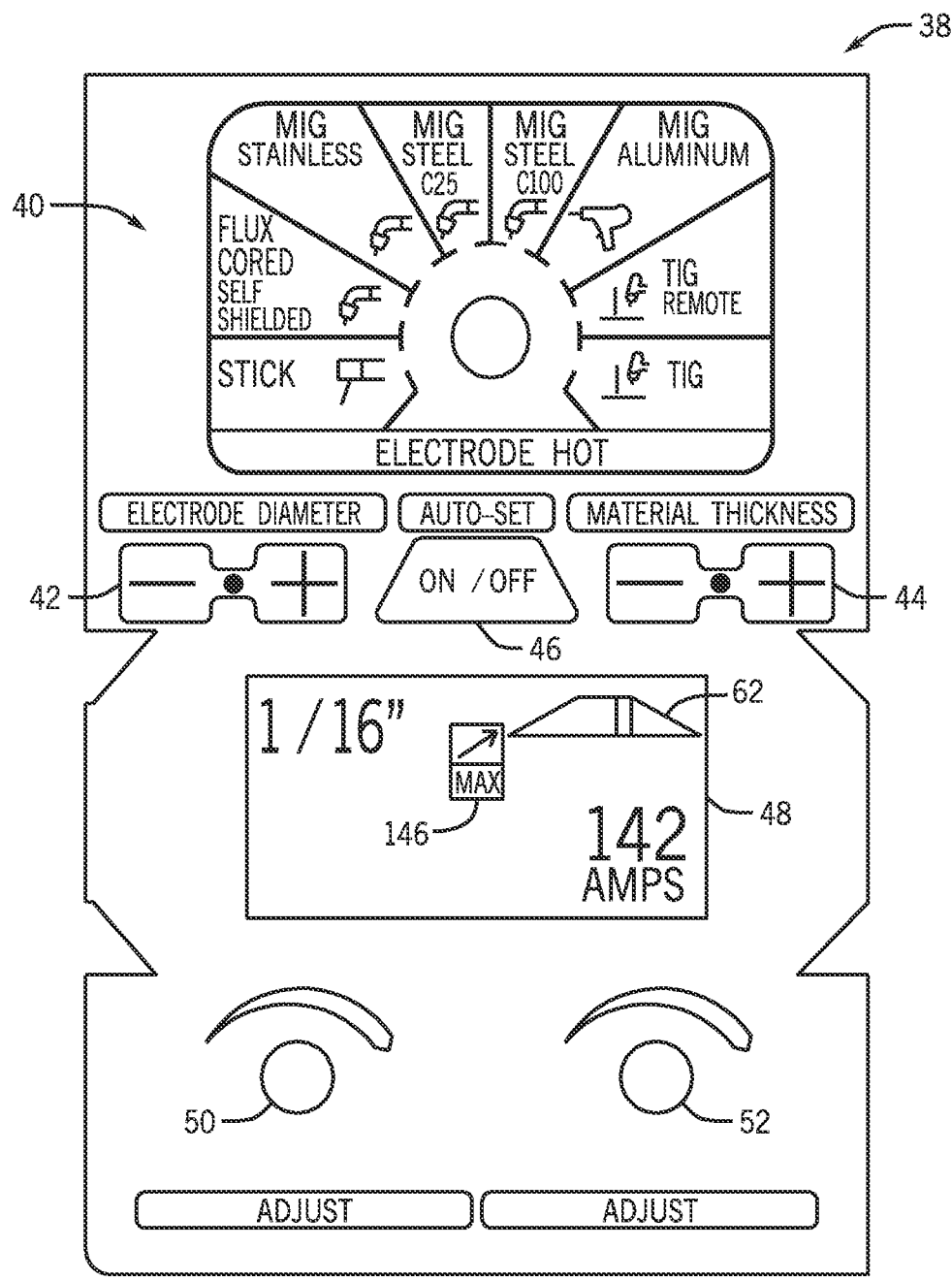
FIG. 19 is a front view of an embodiment of the interface for a TIG remote adjust state including auto-set welding parameters and range and remote graphical indicators.
Figure 20:
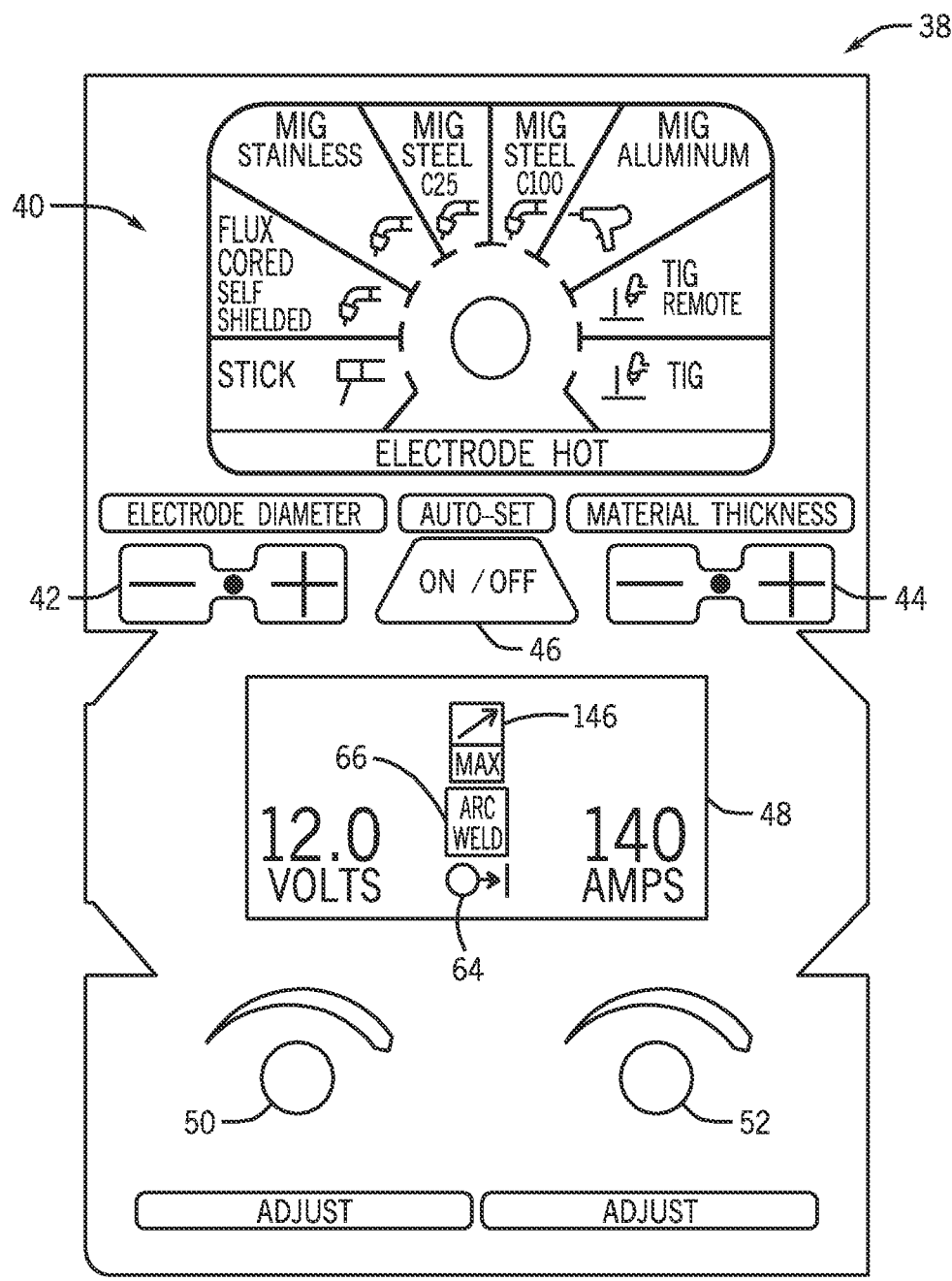
FIG. 20 is a front view of an embodiment of the interface for a TIG remote weld state including auto-set welding parameters and remote, arc weld, and output graphical indicators.
Figure 21:
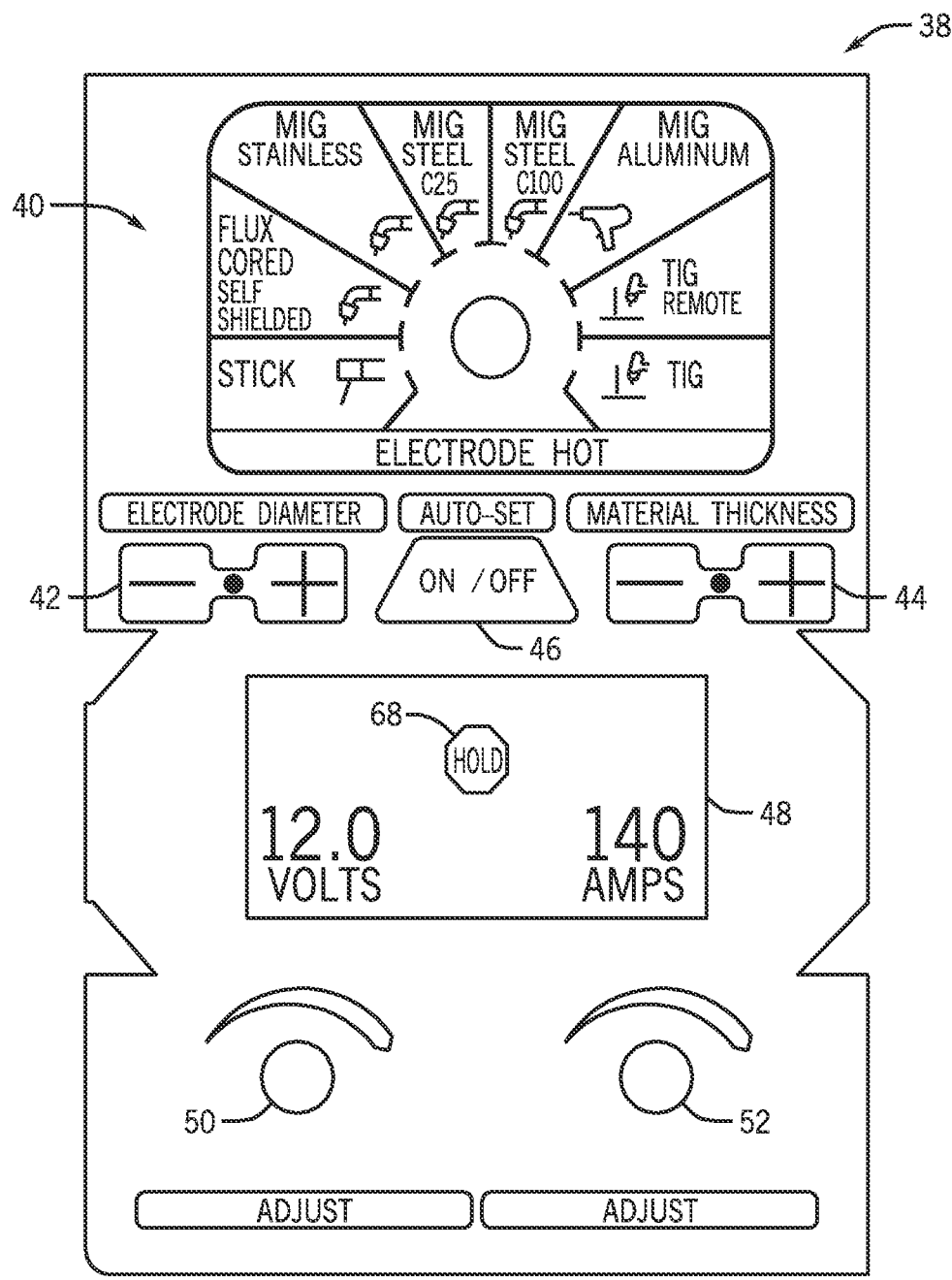
FIG. 21 is a front view of an embodiment of the interface for a TIG remote hold state including auto-set welding parameters and a hold graphical indicator.
Figure 22:
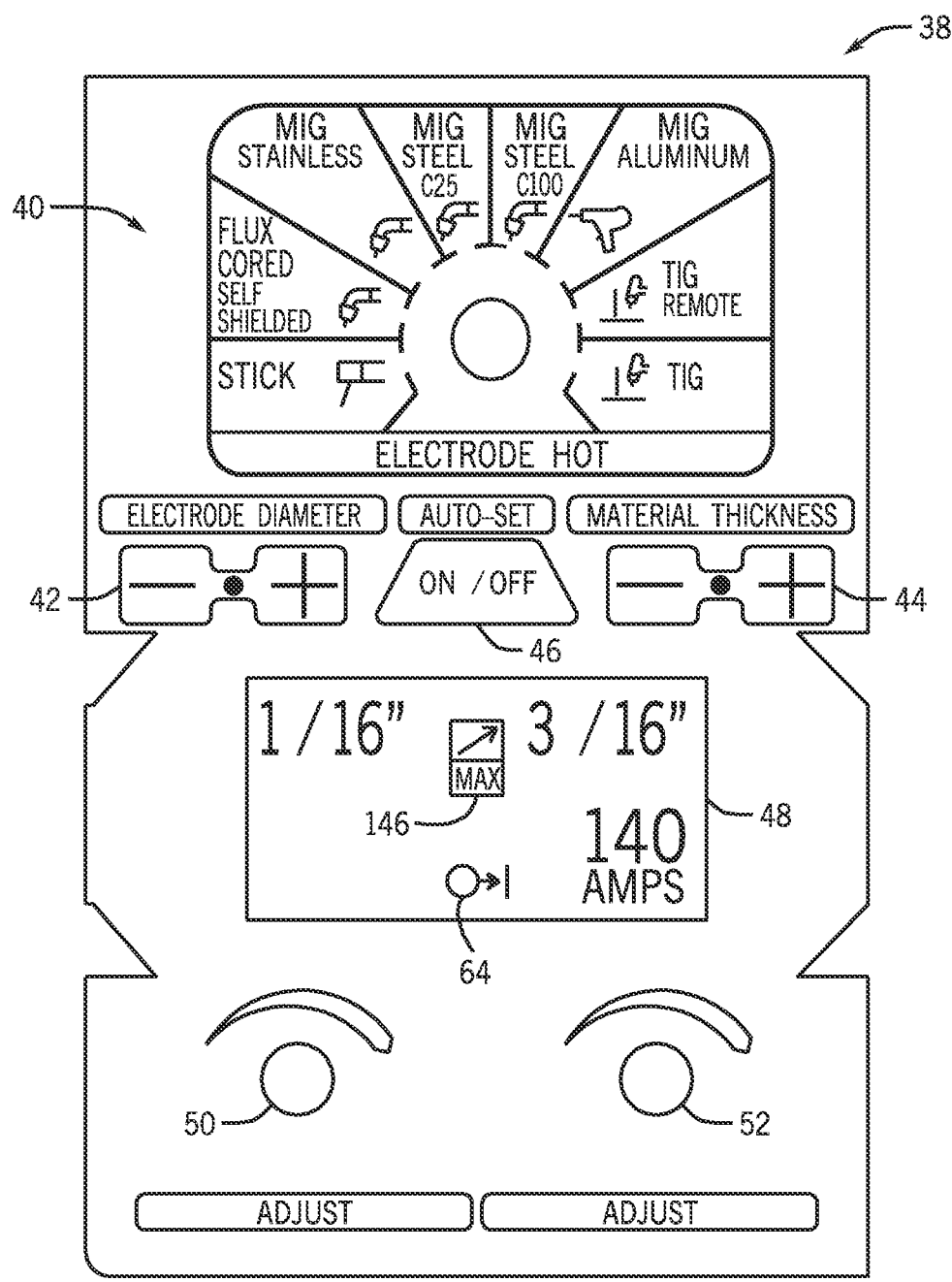
FIG. 22 is a front view of an embodiment of the interface for a TIG remote OCV state including auto-set welding parameters and remote and output graphical indicators.
Figure 23:
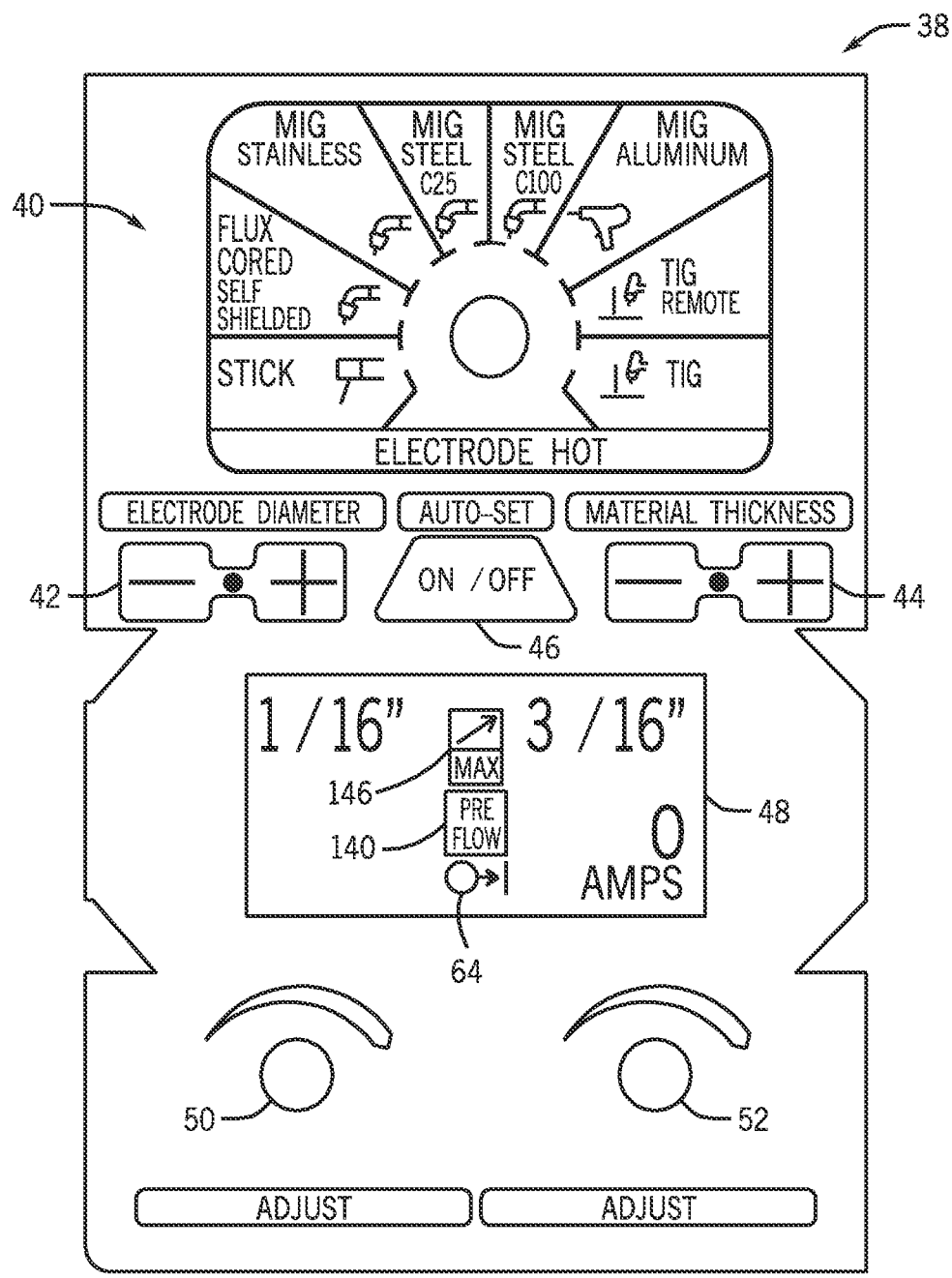
FIG. 23 is a front view of an embodiment of the interface for a TIG remote pre-flow state including auto-set welding parameters and remote, pre-flow, and output graphical indicators.
Figure 24:
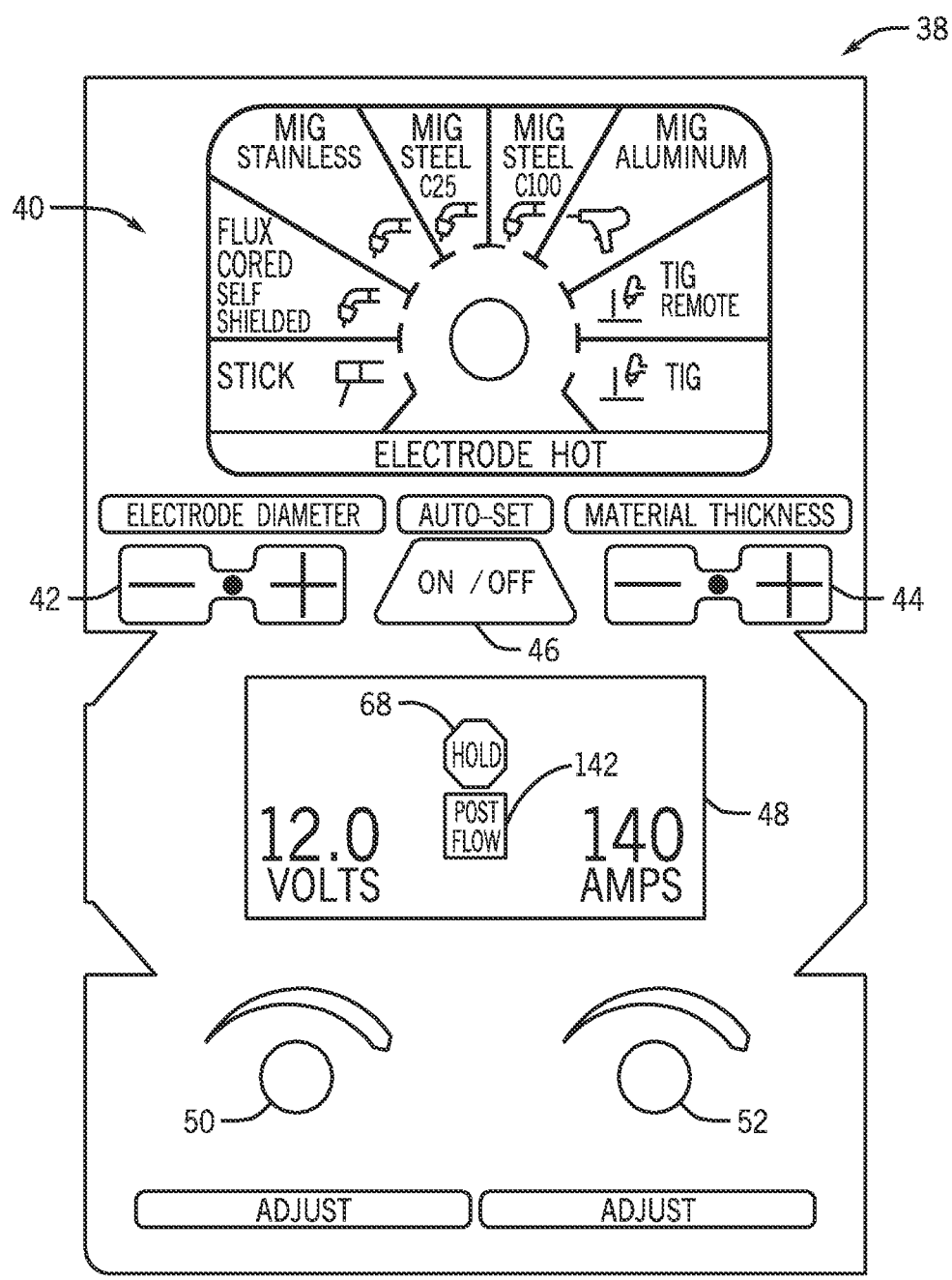
FIG. 24 is a front view of an embodiment of the interface for a TIG remote post-flow state including auto-set welding parameters and remote, post-flow, and output graphical indicators.
Figure 25:
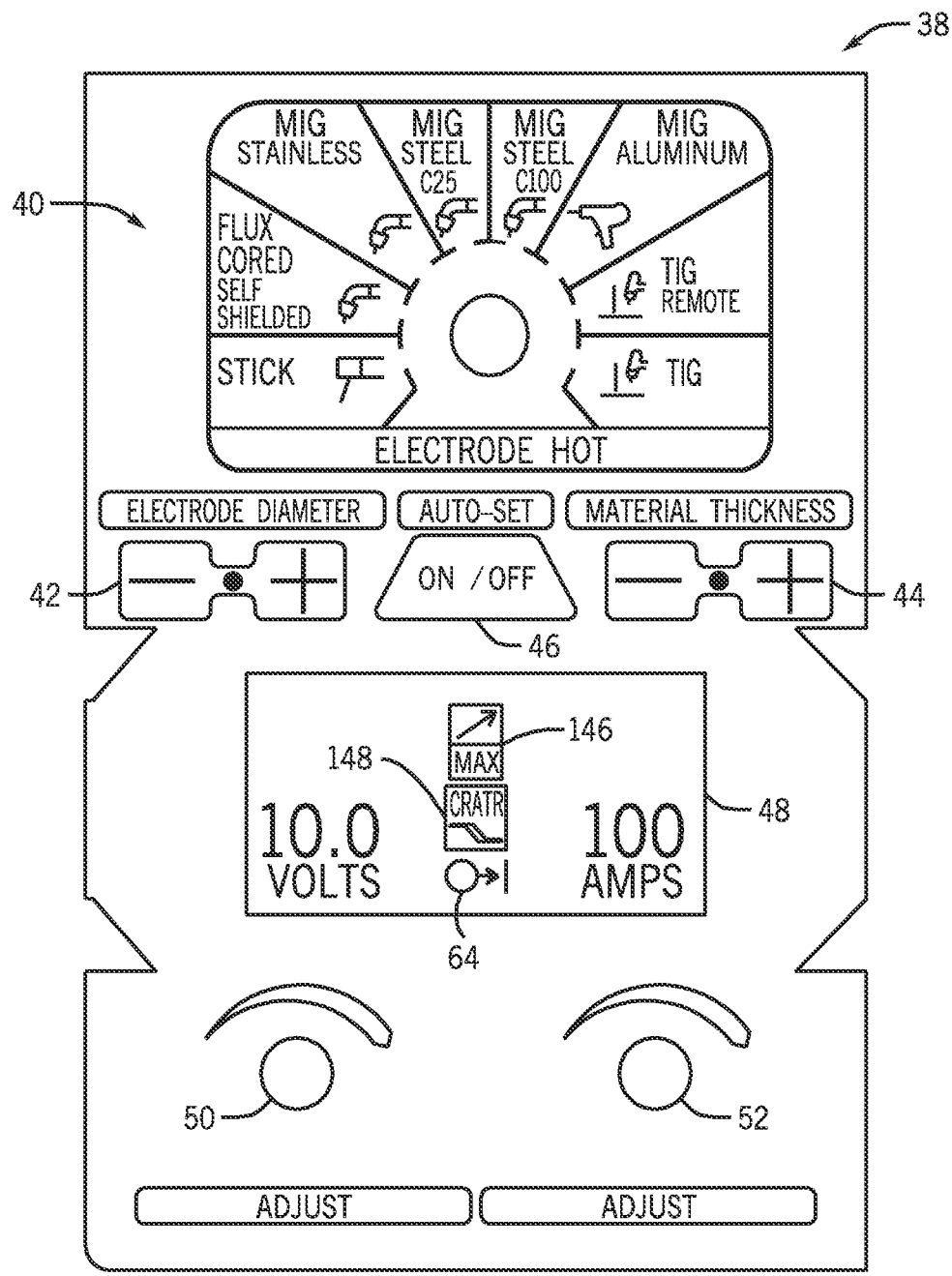
FIG. 25 is a front view of an embodiment of the interface for a TIG remote crater state including auto-set welding parameters and remote, crater, and output graphical indicators.

In certain embodiments, the TIG remote process may be selected via the welding process selector 40 of the user interface 38. As depicted within the display screen 48 illustrated in FIG. 18, the TIG remote process may be indicated by a graphical indicator 146. In such a process, one or more welding parameters may be remotely controlled or adjusted by an operator. For example, FIG. 18 illustrates the TIG remote standby state, where ¹⁄₁₆" represents an entered value of electrode diameter, and ³⁄₁₆" represents an entered value of material thickness. The power source 16 may automatically set the appropriate setting of the amperage parameter (e.g., 140 amps). Similarly, FIG. 19 displays the TIG remote adjust state, in which the graphical range indicator 62 may illustrate (e.g., displaying varying colors or movement of a range bar) whether the welding amperage parameter (e.g., 142 amps) is within the acceptable range as an operator, for example, remotely adjusts the amperage parameter. FIG. 20 illustrates the TIG remote weld state, in which the appropriate settings for welding voltage (e.g., 12.0 volts) and welding amperage (e.g., 140 amps) are automatically displayed while an operator or other user executes a weld. Similarly, FIG. 21 displays the TIG remote hold state, wherein, for example, after displaying the aforementioned weld state, the operating welding voltage (e.g., 12.0 volts) and welding amperage (e.g., 140 amps) parameters are further held for an additional duration, such that the operator may note those preceding welding parameters. FIG. 22 depicts the TIG remote open circuit voltage (OCV) state, where the appropriate amperage (e.g., 140 amps) parameter setting is automatically set upon receiving the electrode diameter (e.g., ¹⁄₁₆") and material thickness (e.g., ³⁄₁₆") inputs (e.g., via the electrode diameter adjustor 42 and the material thickness adjustor 44). The output graphical indicator 64 further signals that there is currently an output power from the power source 16, but that no welding arc is maintained. The TIG remote process may also include pre-flow and post-flow states, as depicted in FIGS. 23 and 24, respectively. The pre-flow state and post-flow state of the TIG remote process may perform the same functions and exhibit the same properties as that of the TIG pre-flow and post-flow states (e.g., as discussed above with respect to FIGS. 15 and 16). Further, FIG. 25 displays the TIG remote crater state, in which the voltage (e.g., 12.0 volts) and amperage (e.g., 140 amps) may both be automatically ramped (i.e., decremented) from the operating welding levels to minimum voltage (e.g., 10.0 volts) and amperage (e.g., 100 amps) levels to terminate the weld. This may be automatically indicated to an operator, for example, via a crater graphical indicator 148.

Figure 26:
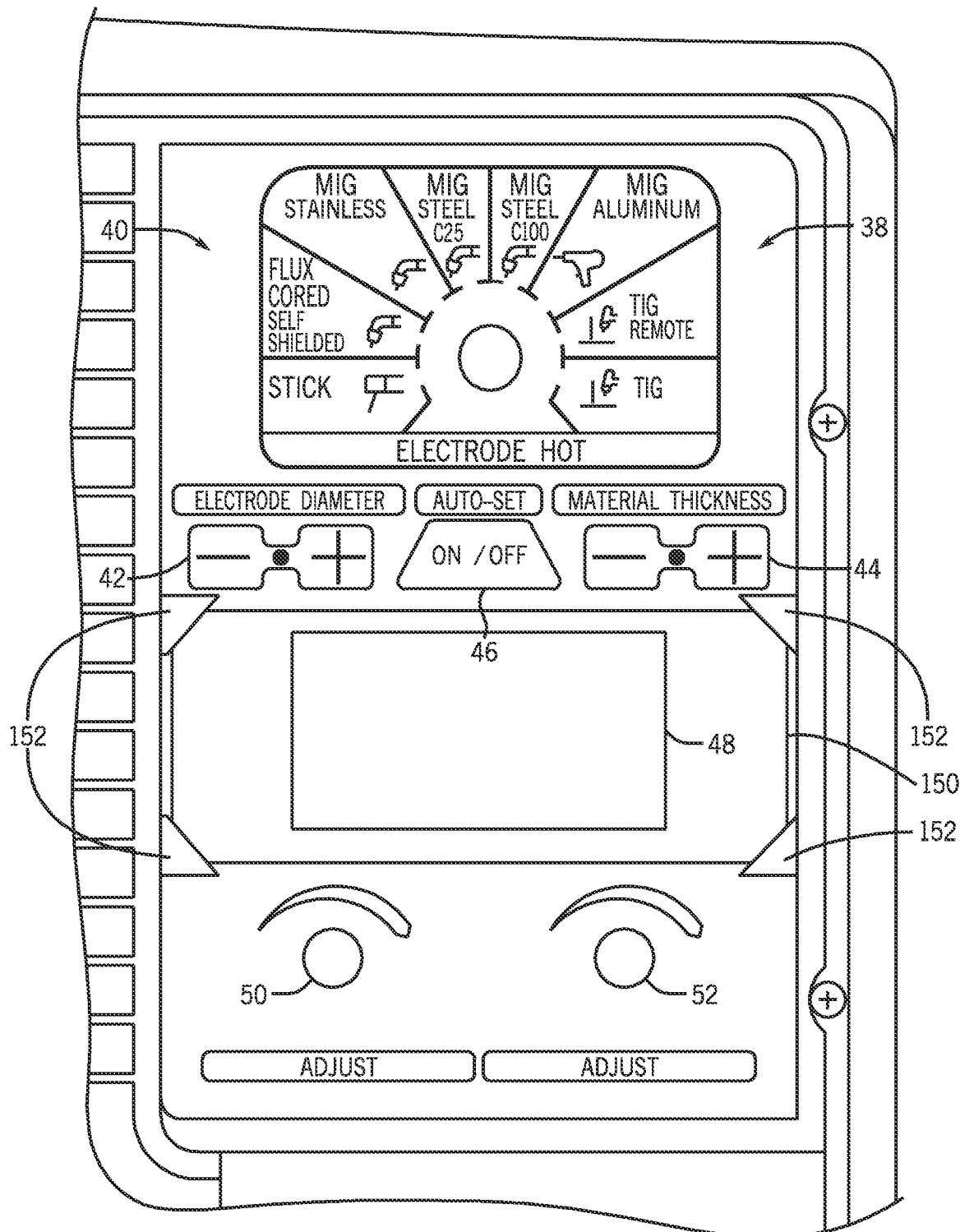
FIG. 26 is a front view of an embodiment of the interface including a replaceable protective shield and attachment clips.

In certain embodiments, a replaceable (and removable) protective shield 150 may be disposed in front of the display screen 48 of the user interface 38, such that the replaceable protective shield 150 may shield or protect the display screen 48, as depicted in FIG. 26. The replaceable protective shield 150 may protect the display screen 48 against damage that may occur during welding operations. The replaceable protective shield 150 may also be composed of a transparent, or otherwise partially translucent, material, thus enabling an operator of the welding system 10 to clearly observe the display screen 48 and indicators displayed therefrom. The replaceable protective shield 150 may be coupled to the user interface 38 in front of the display screen 48 via one or more attachment clips 152 on the outer surface of the user interface 38. The attachment clips 152 may each be, for example, triangular-shaped attachments disposed along the corners of the replaceable protective shield 150 in order to adequately hold the replaceable protective shield 150 in place. In the case that the replaceable protective shield 150 may need to be removed or replaced, the attachment clips 152 may allow simple removal by manually flexing the replaceable protective shield 150 until it becomes detachable from each of the attachment clips 152.

The embodiments described herein provide an intuitive and flexible graphical user interface for setting welding parameters for various processes, material types, material thicknesses, gas types, and electrode diameters. The embodiments described herein provide a quick and simple means for setting welding parameters to a novice operator, or even an experienced operator, who may be unfamiliar with a certain welding process. The embodiments described herein further display graphical representations of recommended welding parameter ranges of values, and display when the given welding parameters are at the appropriate or optimal settings. The graphical user interface is also configured to render additional instruction and guidance to the operator for a given selected welding process. The embodiments described herein also give the operator a simple means to enable or disable the auto-set function, such that the operator may take advantage of the automatic setting of welding parameters, or make use of the traditional manual setting of the welding parameters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A welding system, comprising:
a power source configured to generate power and deliver the power to a welding torch;
a welding wire feeder configured to advance wire electrode into the welding torch at a rate of advancement;
an interface, comprising:
a first input device configured to receive a first input relating to a parameter of the power;
a second input device configured to receive a second input relating to the rate of advancement of the wire electrode;
a third input device configured to receive a third input relating to whether the parameter of the power and the rate of advancement of the wire electrode are automatically set based on each other; and
a display device configured to display the parameter of the power, the rate of advancement of the wire electrode, a first graphical representation of a first acceptable range of values for the parameter of the power, and a second graphical representation of a second acceptable range of values for the rate of advancement of the wire electrode; and
control circuitry configured to:
in response to determining that the first input device received the first input while the third input device is activated:
control the power source to adjust the parameter of the power based on the first input; and
control the display device to display the first graphical representation of the first acceptable range of values for the parameter of the power; and
in response to determining that the second input device received the second input while the third input device is activated:
control the welding wire feeder to adjust the rate of advancement of the wire electrode based on the second input; and
control the display device to display the second graphical representation of the second acceptable range of values for the rate of advancement of the wire electrode.

2. The welding system of claim 1, wherein the interface comprises a fourth input device configured to receive a fourth input relating to a welding process type, wherein at least one of the first or second acceptable ranges of values are determined based at least in part on the welding process type.

3. The welding system of claim 2, wherein the fourth input device comprises a selectable option of a metal inert gas (MIG) welding process as the welding process type.

4. The welding system of claim 2, wherein the fourth input device comprises a selectable option of a flux cored welding process as the welding process type.

5. The welding system of claim 1, wherein the interface comprises a fourth input device configured to receive a fourth input relating to a diameter of the wire electrode, wherein at least one of the first or second acceptable ranges of values are determined based at least in part on the diameter of the wire electrode.

6. The welding system of claim 1, wherein the interface comprises a fourth input device configured to receive a fourth input relating to a material thickness of a work piece to which the wire electrode is directed from the welding torch, wherein at least one of the first or second acceptable ranges of values are determined based at least in part on the material thickness.

7. The welding system of claim 1, wherein the control circuitry is configured to:
display the first graphical representation of the first acceptable range of values for the parameter of the power for a predetermined amount of time after the first input is received by the first input device; and display the second graphical representation of the second acceptable range of values for the rate of advancement of the wire electrode for the predetermined amount of time after the second input is received by the second input device.

8. The welding system of claim 1, wherein the control circuitry is configured to only accept values from the first input device that correspond to values of the parameter of the power that are within the first acceptable range of values for the parameter of the power.

9. The welding system of claim 1, wherein the control circuitry is configured to only accept values from the second input device that correspond to values of the rate of advancement of the wire electrode that are within the second acceptable range of values for the rate of advancement of the wire electrode.

10. The welding system of claim 1, wherein the interface comprises a removable protection shield configured to be located adjacent to the display device, wherein the removable protection shield protects the display device from debris when held in place on the interface by one or more attachment clips of the interface.

11. A welding system, comprising:
a power source configured to generate power and deliver the power to a welding torch;
an interface, comprising:
a first input device configured to receive a first input relating to a parameter of the power;
a second input device configured to receive a second input relating to whether the parameter of the power is bound to an acceptable range of values based on other parameters of a welding process; and
a display device configured to display the parameter of the power, and a graphical representation of an acceptable range of values for the parameter of the power; and
control circuitry configured to, in response to determining that the first input device received the first input while the second input device is activated:
control the power source to adjust the parameter of the power based on the first input; and
control the display device to display the graphical representation of the acceptable range of values for the parameter of the power.

12. The welding system of claim 11, wherein the interface comprises a third input device configured to receive a third input relating to a welding process type of the welding process, wherein the acceptable range of values is determined based at least in part on the welding process type.

13. The welding system of claim 12, wherein the third input device comprises a selectable option of a tungsten inert gas (TIG) welding process as the welding process type.

14. The welding system of claim 12, wherein the third input device comprises a selectable option of a stick welding process as the welding process type.

15. The welding system of claim 11, wherein the interface comprises a third input device configured to receive a third input relating to a diameter of an electrode used in the welding process, wherein the acceptable range of values is determined based at least in part on the diameter of the electrode.

16. The welding system of claim 11, wherein the interface comprises a third input device configured to receive a third input relating to a material thickness of a work piece to which a wire electrode is directed from the welding torch, wherein the acceptable range of values is determined based at least in part on the material thickness.

17. The welding system of claim 11, wherein the control circuitry is configured to display the graphical representation of the acceptable range of values for the parameter of the power for a predetermined amount of time after the first input is received by the first input device.

18. The welding system of claim 11, wherein the control circuitry is configured to only accept values from the first input device that correspond to values of the parameter of the power that are within the acceptable range of values for the parameter of the power.

19. The welding system of claim 11, wherein the interface comprises a removable protection shield configured to be located adjacent to the display device, wherein the removable protection shield protects the display device from debris when held in place on the interface by one or more attachment clips of the interface.

20. A method, comprising:
controlling a power source of a welding system performing a welding process to generate power according to a first target value of a parameter of power of the welding system, wherein the power is delivered to a welding torch of the welding system;
receiving an input relating to the parameter of power via a welding system interface of the welding system;
determining a second target value of the parameter of power based on the input;
determining an acceptable range of values for the parameter of power based on other parameters of the welding process;
controlling the power source to generate the power according to the second target value of the parameter of power; and
controlling a display device of the welding system interface to display the acceptable range of values.

* * * * *